(12) United States Patent
Lee et al.

(10) Patent No.: US 10,205,542 B2
(45) Date of Patent: Feb. 12, 2019

(54) OPERATION METHOD OF ELECTRONIC DEVICE FOR TRANSMITTING RF SIGNAL AND ELECTRONIC DEVICE THEREOF

(71) Applicant: Samsung Electronics Co., Ltd, Gyeonggi-do (KR)

(72) Inventors: Young-Min Lee, Seoul (KR); Jung-Hwan Son, Gyeonggi-do (KR); Yu-Seon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 15/236,354

(22) Filed: Aug. 12, 2016

(65) Prior Publication Data
US 2017/0048007 A1 Feb. 16, 2017

(30) Foreign Application Priority Data
Aug. 12, 2015 (KR) .................. 10-2015-0113885

(51) Int. Cl.
| | |
|---|---|
| *H04B 17/10* | (2015.01) |
| *H04B 17/00* | (2015.01) |
| *H04B 7/00* | (2006.01) |
| *H04B 1/04* | (2006.01) |
| *H04W 52/42* | (2009.01) |
| *H04B 17/13* | (2015.01) |

(52) U.S. Cl.
CPC .............. *H04B 17/104* (2015.01); *H04B 1/04* (2013.01); *H04B 17/13* (2015.01); *H04W 52/42* (2013.01)

(58) Field of Classification Search
CPC . H03C 1/62; H04B 17/00; H04B 1/04; H04B 7/005; H04W 52/226; H03G 3/3042; H03G 3/30; H04Q 7/32; H03F 3/195; H03F 3/213; H03F 2200/105; H03F 220/451

See application file for complete search history.

(56) References Cited

U.S. PATENT DOCUMENTS

| | | | | |
|---|---|---|---|---|
| 5,049,832 | A * | 9/1991 | Cavers ................. | H03F 1/3247 330/149 |
| 6,026,284 | A * | 2/2000 | Seo ...................... | H03G 3/3042 330/284 |
| 6,191,653 | B1* | 2/2001 | Camp, Jr. ............... | H03C 5/00 330/10 |
| 6,642,785 | B2* | 11/2003 | Jin ....................... | H03F 1/3247 330/129 |
| 6,807,405 | B1 | 10/2004 | Jagger et al. | |
| 6,996,381 | B2* | 2/2006 | Lee ...................... | H03G 3/3036 455/115.1 |

(Continued)

*Primary Examiner* — Pablo Tran

(57) ABSTRACT

Disclosed is a method of operating an electronic device to transmit an RF signal. The method includes: selecting output power of a PA included in the electronic device, which is required when a signal is transmitted through an antenna included in the electronic device; determining input power of the PA corresponding to the output power of the PA by using at least one of a first data point, a second data point, or a plurality of data points stored in a memory included in the electronic device; and controlling output power of an RF transmission circuit included in the electronic device based on the input power, wherein the plurality of data points are generated by being linearly interpolated between the first data point and the second data point. Various embodiments are possible.

7 Claims, 12 Drawing Sheets

(56) References Cited

U.S. PATENT DOCUMENTS

| | | | | |
|---|---|---|---|---|
| 7,313,063 B2* | 12/2007 | Liu | ............... | G11B 7/1267 |
| | | | | 369/47.28 |
| 7,535,298 B2* | 5/2009 | Sihlbom | ............ | H03F 1/3247 |
| | | | | 330/149 |
| 7,684,760 B2* | 3/2010 | Kwak | ............ | H04W 52/226 |
| | | | | 455/115.1 |
| 7,772,922 B1* | 8/2010 | Olgaard | ............ | H04B 17/102 |
| | | | | 330/2 |
| 8,233,859 B2* | 7/2012 | Yu | ............... | H03G 3/3042 |
| | | | | 455/127.2 |
| 8,340,602 B1* | 12/2012 | Peiris | ............ | H04B 1/0475 |
| | | | | 455/114.3 |
| 8,682,315 B2* | 3/2014 | Mehta | ............ | H03F 1/3247 |
| | | | | 455/114.1 |
| 9,094,067 B2* | 7/2015 | Collados Asensio | ............ | |
| | | | | H03F 1/0211 |

* cited by examiner

OPERATION METHOD OF ELECTRONIC DEVICE FOR TRANSMITTING RF SIGNAL AND ELECTRONIC DEVICE THEREOF

CROSS-REFERENCE TO RELATED APPLICATION(S) AND CLAIM OF PRIORITY

The present application is related to and claims priority under 35 U.S.C. § 119(a) to Korean Application Serial No. 10-2015-0113885, which was filed in the Korean Intellectual Property Office on Aug. 12, 2015, the entire content of which is hereby incorporated by reference.

TECHNICAL FIELD

The present disclosure relates to an operation method of an electronic device for transmitting an RF signal and an electronic device thereof.

BACKGROUND

A communication device that performs communication through wireless communication includes many integrated circuits (ICs) as well as an RF power amplifier (PA) for increasing power of a transmission signal. The RF PA included in the communication device may amplify a radio frequency (RF) signal and transmit the amplified RF signal through an antenna. As described above, the PA may be used to amplify an RF signal having relatively low power.

Since the PA and an RF front-end (for example, a switch, a diplexer, or the like) correspond to analog circuits, the PA and RF have different characteristics in different communication devices. Accordingly, in order to match characteristics for RF signal transmission, different analog circuit-specific characteristics may be identically calibrated. For example, RF power required for the RF signal transmission is calibrated for the RF signal transmission by adjusting a gain of a transmitter and a gain of a power amplifier and then measuring output power corresponding to input power.

SUMMARY

In conventional arts, all output powers corresponding to power modes were calibrated according to each power mode of a power amplifier in order to calibrate characteristics of the power amplifier for RF signal transmission. Since this is equally applied to a case where an average power tracking (APT) technology is combined, the calibration was performed by providing a different voltage according to each power mode or configuring a separate APT table to implement APT. As described above, when the calibration for all the output powers was performed, the calibration had to be performed even for unnecessary output power and power modes, so that calibration time became longer and storage of an unnecessary gain table and input power value was needed.

To address the above-discussed deficiencies, it is a primary object to provide an operation method of an electronic device to transmit an RF signal and an electronic device thereof in order to solve the aforementioned problems or other problems.

In accordance with an aspect of the present disclosure, an electronic device is provided. The electronic device includes a housing, an antenna included within the housing or formed by a part of the housing, a power amplifier (PA) electrically connected to the antenna, a radio frequency (RF) transmission circuit electrically connected to the power amplifier, a processor electrically connected to the RF transmission circuit and the PA, and a memory electrically connected to the processor, and the memory stores information on a change in output power according to a change in input power of the PA, the information containing a first data point based on first input power, a second data point based on second input power, and a first plurality of data points generated by being linearly interpolated between the first data point and the second data point, and the memory stores instructions to instruct the processor to select output power of the PA required when a signal is transmitted through the antenna, to determine input power of the PA corresponding to the output of the PA by using at least one of the first data point, the second data point, or the first plurality of data points, and to control output power of the RF transmission circuit based on the input power when the instructions are executed.

In accordance with another aspect of the present disclosure, a method of operating an electronic device to transmit an RF signal is provided. The method includes selecting output power of a PA included in the electronic device, which is required when a signal is transmitted through an antenna included in the electronic device, determining input power of the PA corresponding to the output power of the PA by using at least one of a first data point, a second data point, or a plurality of data points stored in a memory included in the electronic device, and controlling output power of an RF transmission circuit included in the electronic device based on the input power, wherein the plurality of data points may be generated by being linearly interpolated between the first data point and the second data point.

In accordance with another aspect of the present disclosure, a method of supplying power for RF signal transmission by an electronic device is provided. The method includes identifying a first power mode corresponding to output power selected for the RF signal transmission among a plurality of power modes of a power amplifier (PA) based on characteristics of the PA, determining input power corresponding to the output power by using information on at least two first data points stored in accordance with the first power mode, and supplying the determined input power to the PA.

In accordance with another aspect of the present disclosure, an electronic device is provided. The electronic device includes a power amplifier (AP) that amplifies and outputs power of an RF signal; a memory that stores information on at least two data points according to each of a plurality of power modes of the PA set based no characteristics of the PA; and a processor that identifies a first power mode corresponding to output power selected for RF signal transmission among the plurality of power modes of the PA, determines input power corresponding to the output power by using information on at least two first data points stored in the memory in accordance with the first power mode, and controls the determined input power to be supplied to the PA.

According to various embodiments of the present disclosure, an electronic device including a power amplifier may perform a calibration for at least two output powers without performing a calibration for all output powers according to each power mode. The electronic device may calculate input powers corresponding to all the output powers through the calibration for at least two output powers and supply the calculated input power for RF signal transmission to the PA. As described above, by performing only the calibration for at least two output powers, calibration time may be reduced and an unnecessary gain table and input power value may not be stored. Further, even though output power for the RF signal transmission changes, input power corresponding to the changed output power may be calculated using a result of the calibration to perform the RF signal transmission.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
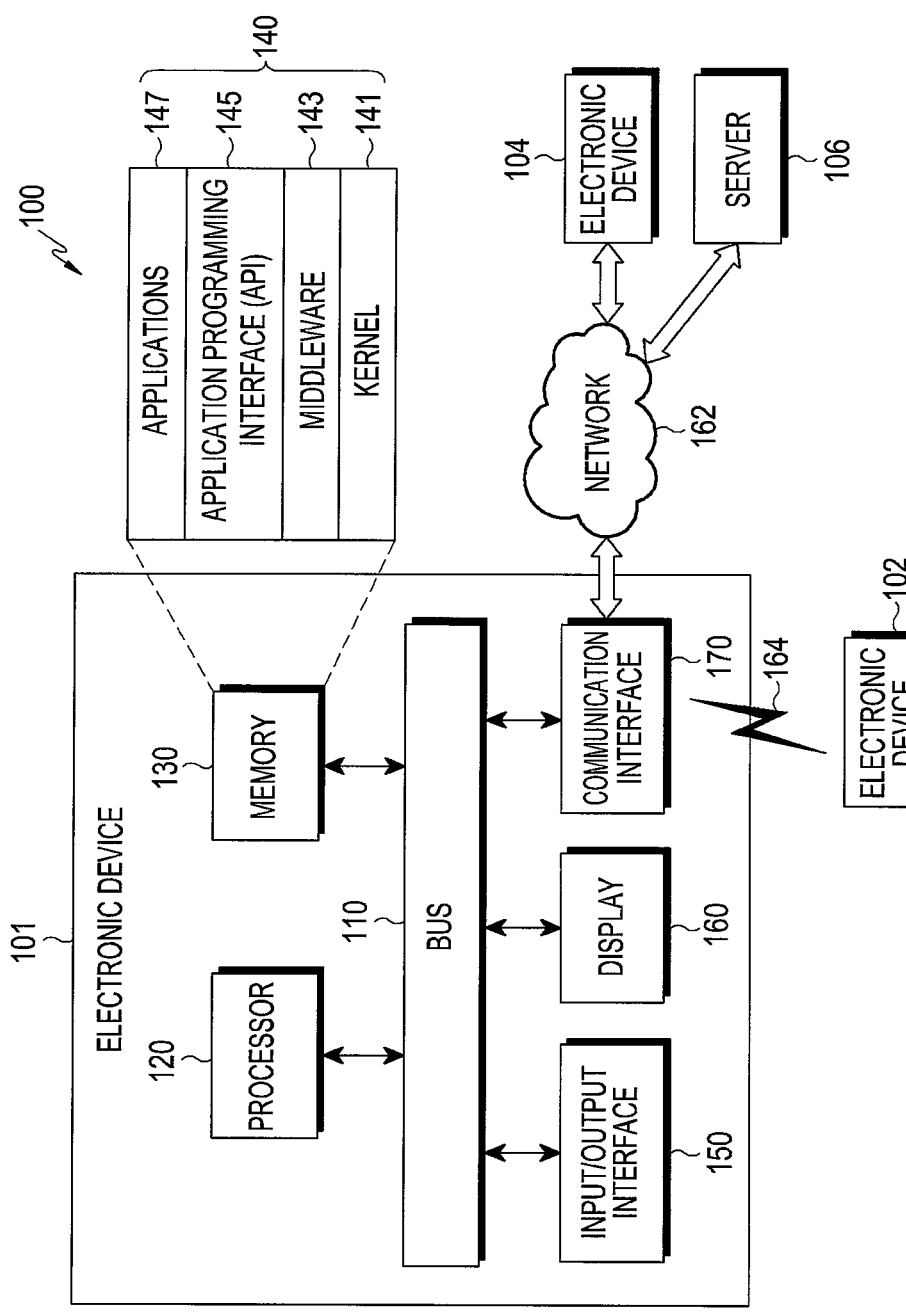
FIG. 1 illustrates a network environment including an electronic device according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. Conversely, when it is mentioned that one element (e.g., a first element) is "directly coupled" or "directly connected" to another element (e.g., a second element), it may be construed that yet another element does not exist between the one element and the another element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that may perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MM), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit which interconnects the components to the communication interface 170 and delivers communication (for example, a control message and/or data) between the components and the communication interface 170.

The processor 120 may include one or more of a central processing unit (CPU), an application processor (AP), and a communication processor (CP). For example, the processor 120 may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output instructions or data received from the other element(s) of the electronic device 101 to the user or the other external device.

The display 160 may include, for example, a liquid crystal display (LCD), a light-emitting diode (LED) display, an Organic light-emitting diode (OLED) display, a micro electro mechanical systems (MEMS) display, and an electronic paper display. The display 160, for example, may display various types of contents (for example, text, images, videos, icons, or symbols) for the user. The display 160 may include a touch screen and receive, for example, a touch, gesture, proximity, or hovering input using an electronic pen or the user's body part.

The communication interface 170 may set, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the external electronic device 104 or the server 106).

The wireless communication may use at least one of, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short-range communication 164. The short range communication 164 may include, for example, at least one of Wi-Fi, Bluetooth, near field communication (NFC), global navigation satellite system (GNSS), and the like. The GNSS may include at least one of, for example, a global positioning system (GPS), a global navigation satellite system (Glonass), a beidou navigation satellite system (hereinafter referred to as "Beidou"), and a european global satellite-based navigation system (Galileo), according to a use area, a bandwidth, or the like. Hereinafter, the "GPS" may be used interchangeably used with the "GNSS" in the present disclosure. The wired communication may include, for example, at least one of a universal serial bus (USB), a high definition multimedia Interface (HDMI), recommended standard 232 (RS-232), and a plain old telephone service (POTS). The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or additionally. Another electronic device (for example, the electronic device 102 or 104) or the server 106 may execute the requested functions or the additional functions, and may deliver a result of the execution to the electronic device 101. The electronic device 101 may provide the received result as it is or additionally process the received result and provide the requested functions or services. To achieve this, for example, cloud computing, distributed computing, or client-server computing technology may be used.

The processor 120 may process at least some of the information obtained from other components (for example, at least one of the memory 130, the input/output interface 150, and the communication interface 170) and utilize the same in various manners. For example, the processor 120 may control at least some functions of the electronic device 101 so that the electronic device 101 may interwork with other electronic devices (for example, the electronic device 102 or 104 or the server 106). The processor 120 may be integrated with the communication interface 170. According to an embodiment, at least one component of the processor 120 may be included in the server 106 and at least one operation implemented by the processor 120 may be supported by the server 106.

According to an embodiment, the memory 130 may include instructions to operate the processor 120. For example, the memory 130 may include instructions for allowing the processor 120 to control other elements of the electronic device 101 and to interwork with other electronic devices 102 and 104 or the server 106. The processor 120 may control other components of the electronic device 101 and interwork with other electronic devices 102 and 104 or the server 106 based on the instructions stored in the memory 130. Hereinafter, the operations of the electronic device 101 will be described based on the respective components of the electronic device 101. Further, the instructions for allowing the receptive components to perform the operations may be included in the memory 130.

The aforementioned other elements (for example, the bus 110, the processor 120, the memory 130, the input/output interface 150, the display 160, and the communication interface 170) may be included in a housing of the electronic device 101. Further, although not illustrated, an antenna for transmitting/receiving an RF signal may be included within the housing or formed by a part of the housing.

According to various embodiments of the present disclosure, the electronic device 101 may include a power amplifier (PA) for amplifying and outputting power of an RF signal to be transmitted. Hereinafter, input power may refer to input power of an RF signal input into the PA, and output power may refer to output power of an RF signal output from the PA.

According to various embodiments of the present disclosure, the electronic device 101 may include an RF transmission circuit for converting a signal generated by the processor 120 into an RF signal. For example, the RF transmission circuit may receive a signal generated by a communication processor (CP), up-modulate the signal into an RF signal, and transmit the RF signal to the PA.

According to various embodiments of the present disclosure, the memory 130 may store information on a change in the output power according to a change in the input power of the PA.

For example, the information on the change in the output power according to the change in the input power may include a first data point based on first input power, a second data point based on second input power, and a plurality of data points generated by being linearly interpolated between the first and second points. The first data point and the second data point may be acquired when the PA is calibrated. The first input power and the second input power may be configured to have a preset difference therebetween to calculate information on a rate of change between the data points.

For example, the first data point may be acquired by supplying the first input power to the PA and, accordingly, measuring the first output power output from the PA. Similarly, the second data point may be acquired by supplying the second input power to the PA and, accordingly, measuring the second output power output from the PA.

The plurality of data points may be generated using the first data point and the second data point. The plurality of data points may be generated based on a rate of change between the first data point and the second data point, for example, an amount of change of the input power and an amount of change of the output power.

According to various embodiments of the present disclosure, the information on the change in the output power according to the change in the input power may include only the first data point and the second data point. Further, the information on the change in the output power according to the change in the input power may further include at least one data point acquired based on input power that is difference from the first input power and the second input power as well as the first data point and the second data point.

In addition, the information on the change in the output power according to the change in the input power may include the first data point, the second data point, and information (for example, slope information) on a rate of change between the first data point and the second data point.

When the information on the rate of change between the first data point and the second data point has been generated, the processor 120 may determine the input power by using the generated information on the rate of change. The processor 120 may determine the input power by using linearity between the data points according to the information on the rate of change.

However, when the information on the rate of change has not been generated, the processor 120 may generate the information on the rate of change by using the first data point and the second data point when an RF signal transmitted and determine the input power by using the generated information on the rate of change.

The information on the change in the output power according to the change in the input power may be stored according to each of a plurality of power modes of the PA configured based on characteristics of the PA. Further, with respect to a power mode that provides the highest power among the plurality of power modes, at least one data point corresponding to a non-linear interval configured according to the characteristics of the PA may be further stored. In order to determine input power corresponding to the output power of the PA in the non-linear interval, a scheme different from that of the linear interval may be applied, so that at least one data point corresponding to the non-linear interval may be further stored.

Further, the information on the change in the output power according to the change in the input power may be stored according to each of a plurality of PA operation voltages configured for each of the plurality of power modes of the PA. The plurality of PA operation voltages configured for each of the plurality of power modes may be configured based on the characteristics of the PA in order to minimize power consumed by the PA.

With respect to a reference PA operation voltage among the plurality of PA operation voltages, at least two data points may be stored to generate information on a rate of change of output power for input power. With respect to the remaining PA operation voltages except for the reference PA operation voltage among the plurality of PA operation voltages, PA gains are different but the information on the rate of change of the output power for the input power generated with respect to the reference PA operation voltage may be used according to characteristics of the PA, so that at least one data point may be stored.

Since information on a rate of change between the input power and the output power is the same according to each power mode, the information on the rate of change of the output power for the input power generated using at least two data points may be applied to the stored data point corresponding to the remaining PA operation voltages set on the same power mode. Accordingly, with respect to the remaining PA operation voltages, the input power may be determined through storage of only at least one data point.

According to various embodiments of the present disclosure, the processor 120 may select output power of the PA required for transmitting an RF signal through the antenna. The processor 120 may select the output power of the PA based on characteristics of the network connected to the electronic device 101. For example, the processor 120 may receive information such as power, a channel, and the like required for transmitting the RF signal from a base station which may be connected to the electronic device 101, and select the output power of the PA based on the information required for transmitting the RF signal.

According to various embodiments of the present disclosure, the processor 120 may determine input power of the PA corresponding to the selected output power of the PA by using information on a change in the output power according to a change in the input power of the PA stored in the memory 130.

When the information on the change in the output power according to the change in the input power is stored according to each of a plurality of power modes of the PA, the processor 120 may identify a first power mode corresponding to the selected output power of the PA among the plurality of power modes of the PA in order to use the information stored in the memory 130.

The PA may operate in one of the plurality of power modes according to the output power of the PA required for transmitting the RF signal. According to the characteristics of the PA, each of the plurality of power modes may correspond to one or more output powers. The processor 120 may select output power required for transmitting the RF signal and identify a power mode corresponding to the selected output power among the plurality of power modes. The processor 120 may control the PA to operate in the identified power mode.

Further, when the information on the change in the output power according to the change in the input power is stored according to each of a plurality of PA operation voltages set on each of the plurality of power modes of the PA, the processor 120 may identify the first power mode in order to use the information stored in the memory 130 and identify a first PA operation voltage corresponding to the selected PA output power among the plurality of PA operation voltages set on the first power mode.

When the first PA operation voltage is identified, the processor 120 may control a voltage regulator included in the electronic device 101 to supply the first PA operation voltage to the PA. The voltage regulator may be included in the electronic device 101 and may provide the PA operation voltage to the PA so that the PA may operate.

According to various embodiments of the present disclosure, the processor 120 may determine input power of the PA corresponding to the PA output power by using at least one of a first data point, a second data point, and a plurality of data points stored in the memory 130 in accordance with the first power mode. When the information on the change in the output power according to the change in the input power stores all of the first data point, the second data point, and the plurality of data points, the processor 120 may determine the PA input power by using at least one of the first data point, the second data point, and the plurality of data points.

For example, in order to determine the input power of the PA, the processor 120 may identify a third data point corresponding to the PA output power among the first data point, the second data point, or the plurality of data points corresponding to the first power mode. The processor 120 may determine whether the information pre-stored in the memory 130 may be directly used through an operation of identifying the third data point.

When the third data point is identified, the processor 120 may determine input power corresponding to the third data point as the input power of the PA by using the information pre-stored in the memory 130.

When the third data point is not identified, the processor 120 may determine the input power of the PA based on information on a rate of change between the first data point and the second data point. For example, the processor 120 may calculate input power corresponding to the selected output power of the PA by applying the information on the rate of change to at least one of the first data point and the second data point. The processor 120 may determine the calculated input power as the input power of the PA.

The information on the rate of change between the first data point and the second data point may be generated when the RF signal is transmitted by the processor 120 or may be generated in advance and stored in the memory 130.

According to various embodiments of the present disclosure, when the information on the change in the output power according to the change in the input power stores only at least two data points such as the first data point and the second data point which have been calibrated, the processor 120 may determine the input power by using the information on the rate of change between the data points as described above.

According to various embodiments of the present disclosure, the processor 120 may identify whether the first power mode is a mode that supplies the highest power among the plurality of power modes of the PA. In the mode that supplies the highest power, there may be a non-linear interval having a non-linear relationship between the input power and the output power according to the characteristics of the PA.

Accordingly, when the selected output power of the PA corresponds to the mode that supplies the highest power and the output power of the PA corresponds to the non-linear interval of the mode that supplies the highest power, the processor 120 may determine input power corresponding to the output power of the PA by using at least one data point corresponding to the non-linear interval stored in the memory 130.

For example, the processor 120 may determine the input power of the PA by using information on rate of changes between at least two data points corresponding to the linear interval and at least one data point corresponding to the non-linear interval. The processor 120 may select a data point which is the closest to the non-linear interval among at least two data points corresponding to the linear interval. The processor 120 may determine the input power of the PA by using information on a rate of change between the selected data point and at least one data point corresponding to the non-linear interval. The information on the rate of change may also be generated when the RF signal is transmitted or may be generated in advance and stored in the memory 130.

Further, similar to the linear interval, with respect to the non-linear interval, the processor 120 may determine the input power of the PA by using information on data points pre-stored in the memory 130. For example, when the output power of the PA corresponds to one data point corresponding to the non-linear interval stored in the memory 130, the processor 120 may determine the input power of the PA through at least one data point without a separate operation.

According to various embodiments of the present disclosure, when the information on the change in the output power according to the change in the input power is stored according to each of the plurality of PA operation voltages, the processor 120 may determine the input power of the PA by using the information on the change in the output power according to the change in the input power of the PA stored in the memory 130 in accordance with the first PA operation voltage.

According to various embodiments of the present disclosure, the processor 120 may compare the first PA operation voltage corresponding to the selected output power of the PA with the reference PA operation voltage. In accordance with the reference PA operation voltage, at least two data points may be stored. Information on a rate of change between the input power and the output power may be generated using at least two data points corresponding to the reference PA operation voltage. The information on the rate of change may be stored in the memory 130 in accordance with the reference PA operation voltage. Further, the information on the rate of change may be generated when the RF signal is transmitted using at least two data points.

When the first PA operation voltage is the same as the reference PA operation voltage, the processor 120 may determine the input power by using at least two data points corresponding to the reference PA operation voltage.

For example, in order to determine the input power of the PA, the processor 120 may identify a fourth data point corresponding to the PA output power among the first data point and the second point corresponding to the first PA operation voltage, or the plurality of data points. The processor 120 may determine whether the information pre-stored in the memory 130 may be directly used through an operation of identifying the fourth data point.

When the fourth data point is identified, the processor 120 may determine input power corresponding to the fourth data point as the input power of the PA by using the information pre-stored in the memory 130.

In contrast, when the fourth data point is not identified, the processor 120 may determine the input power of the PA based on the information on the rate of change between the first data point and the second data point. For example, the processor 120 may calculate input power corresponding to the selected output power of the PA by applying the information on the rate of change to at least one of the first data point and the second data point. The processor 120 may determine the calculated input power as the input power of the PA.

When the first PA operation voltage is different from the reference PA operation voltage, the processor 120 may determine the input power of the PA by using characteristics of the PA in which the information on the rate of change between the input power and the output power is equally set in one power mode.

For example, the processor 120 may determine the input power of the PA by further using information on at least one third data point stored in the memory 130 in accordance with the first PA operation voltage different from the reference PA operation voltage.

The processor 120 may determine the input power of the PA corresponding to the selected output power of the PA by applying information (for example, slope information) on the rate of change between at least two data points to at least one third data point. Since the first PA operation voltage and the reference PA operation voltage are set on the same power mode, the input power may be determined by applying the information on the rate of change generated through the data points corresponding to the reference PA operation voltage to the third data point.

According to various embodiments of the present disclosure, the processor 120 may control output power of the RF transmission circuit based on the determined input power of the PA. Accordingly, the processor 120 may control the determined input power of the PA to be supplied to the PA.

According to various embodiments of the present disclosure, an electronic device may include a housing, an antenna included within the housing or formed by a part of the housing, a power amplifier (PA) electrically connected to the antenna, a radio frequency (RF) transmission circuit electrically connected to the power amplifier, a processor electrically connected to the RF transmission circuit and the PA, and a memory electrically connected to the processor, and the memory may store information on a change in output power according to a change in input power of the PA, the information containing a first data point based on first input power, a second data point based on second input power, and a first plurality of data points generated by being linearly interpolated between the first and second data points, and the memory may store instructions to instruct the processor to select output power of the PA required when a signal is transmitted through the antenna, to determine input power of the PA corresponding to the output power of the PA by using at least one of the first data point, the second data point, or the first plurality of data points, and to control output power of the RF transmission circuit based on the input power when the instructions are executed.

According to various embodiments of the present disclosure, the information may contain a third data point based on third input power, a fourth data point based on fourth input power, and a second plurality of data points linearly formed between the third and fourth data points, and at least some of output values of the second plurality of data points may be smaller than output values of the first plurality of data points.

According to various embodiments of the present disclosure, the first data point, the second data point, or the first plurality of data points may be associated with a first power mode of the PA, and the third data point, the fourth data point, or the second plurality of data points may be associated with a second power mode of the PA.

According to various embodiments of the present disclosure, the information may contain a fifth data point based on fifth input power, a sixth data point based on sixth input power, and a third plurality of data points linearly formed between the fifth and sixth data points, and some of output values of the third plurality of data points may be smaller than output values of the second plurality of data points.

According to various embodiments of the present disclosure, the fifth data point, the sixth data point, or the third plurality of data points may be associated with a third power mode of the PA.

According to various embodiments of the present disclosure, the memory may store information on a change in output power according to a change in input power of the PA according to each of a plurality of power modes of the PA set based on characteristics of the PA.

According to various embodiments of the present disclosure, the memory may store instructions to instruct the processor to identify a first power mode corresponding to selected output power of the PA among the plurality of power modes of the PA.

According to various embodiments of the present disclosure, the memory may store instructions to instruct the processor to determine input power of the PA corresponding to the output power of the PA by using at least one of the first data point, the second data point, and the first plurality of data points stored in the memory in accordance with the first power mode.

According to various embodiments of the present disclosure, the memory may store instructions to instruct the processor to identify a data point corresponding to the PA output power among the first data point, the second data point, or the first plurality of data points corresponding to the first power mode and, when the data point is identified, to determine input power corresponding to the identified data point as the input power of the PA.

According to various embodiments of the present disclosure, the memory may store instructions to instruct the processor to determine the input power of the PA based on a rate of change between the first data point and the second data point when the data point is not identified.

According to various embodiments of the present disclosure, the memory may store information on a change in output power according to a change in input power of the PA according to each of a plurality of PA operation voltages set for each of a plurality of power modes of the PA set based on characteristics of the PA.

According to various embodiments of the present disclosure, the memory may store instructions to instruct the processor to identify a first power mode corresponding to the selected output power of the PA among the plurality of power modes of the PA and to identify a first PA operation voltage corresponding to the selected output power of the PA among the plurality of PA operation voltages set on the first power mode.

According to various embodiments of the present disclosure, the electronic device may further include a voltage regulator electrically connected to the PA and the processor, wherein the memory may store instructions to instruct the processor to control the voltage regulator to supply the identified first PA operation voltage to the PA.

According to various embodiments of the present disclosure, the memory may store instructions to instruct the processor to determine the input power of the PA corresponding to the output power of the PA by using at least one of the first data point, the second data point, or the first plurality of data points stored in the memory in accordance with the first PA operation voltage.

Figure 2:
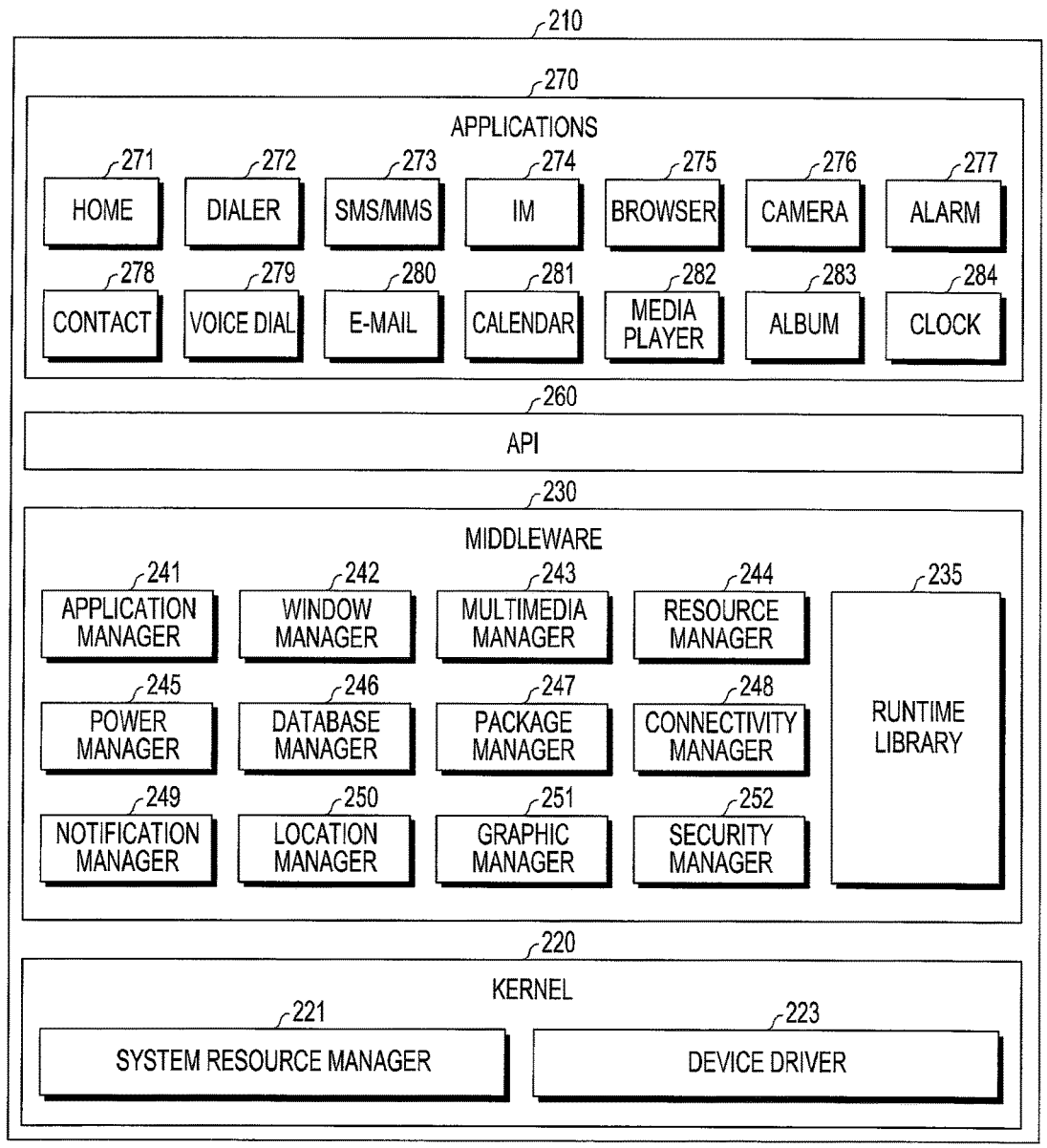
FIG. 2 illustrates a block diagram of a program module according to various embodiments of the present disclosure.

FIG. 2 illustrates a block diagram of a program module according to various embodiments. According to an embodiment, the program module 210 (for example, the program 140) may include an operating system (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 210 may include a kernel 220, middleware 230, an application programming interface (API) 260, and/or applications 270. At least some of the program module 210 may be preloaded on the electronic device, or may be downloaded from an external electronic device (for example, the electronic device 102 or 104, or the server 106).

The kernel 220 (for example, the kernel 141) may include, for example, a system resource manager 221 and/or a device driver 223. The system resource manager 221 may control, assign, or collect system resources. According to an embodiment, the system resource manager 221 may include a process manager, a memory manager, or a file system manager. The device driver 223 may include, for example, a display driver, a camera driver, a Bluetooth driver, a shared memory driver, a USB driver, a keypad driver, a Wi-Fi driver, an audio driver, or an inter-process communication (IPC) driver.

The middleware 230 may provide a function required by the applications 270 in common or provide various functions to the applications 270 through the API 260 so that the applications 270 may efficiently use limited system resources within the electronic device. According to an embodiment, the middleware 230 (for example, the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the applications 270 are executed. The runtime library 235 may perform input/output management, memory management, or a function for an arithmetic function.

The application manager 241 may manage, for example, a life cycle of at least one of the applications 270. The window manager 242 may manage graphical user interface (GUI) resources used on a screen. The multimedia manager 243 may identify formats required for the reproduction of various media files and encode or decode a media file using a codec suitable for the corresponding format. The resource manager 244 may manage resources of at least one of the applications 270, such as a source code, a memory, and a storage space.

The power manager 245 may operate together with, for example, a basic input/output system (BIOS), and the like and may manage a battery or power, and may provide power information and the like required for an operation of the electronic device. The database manager 246 may generate, search, or change a database to be used in at least one of the applications 270. The package manager 247 may manage the installation or the updating of an application distributed in the form of a package file.

The connectivity manager 248 may manage a wireless connection such as, for example, Wi-Fi or Bluetooth. The notification manager 249 may display or notify of an event, such as an arrival message, an appointment, proximity notification, and the like, in such a manner of not disturbing a user. The location manager 250 may manage location information of the electronic device. The graphic manager 251 may manage a graphic effect to be provided to a user and a user interface relating to the graphic effect. The security manager 252 may provide all security functions required for system security or user authentication. According to an embodiment, when the electronic device (for example, the electronic device 101) has a telephone call function, the middleware 230 may further include a telephony manager for managing a voice call function or a video call function of the electronic device.

The middleware 230 may include a middleware module that forms combinations of various functions of the above described elements. The middleware 230 may provide specialized modules according to types of operating systems in order to provide differentiated functions. Furthermore, the middleware 230 may dynamically remove some of the existing elements, or may add new elements.

The API 260 (for example, the API 145) is, for example, a set of API programming functions, and may be provided with a different configuration according to an OS. For example, in the case of Android or iOS, one API set may be provided for each platform, and in the case of Tizen, two or more API sets may be provided for each platform.

The applications 270 (for example, the application programs 147) may include, for example, one or more applications that may perform functions, such as home 271, dialer 272, SMS/MMS 273, instant message (IM) 274, browser 275, camera 276, alarm 277, contacts 278, voice dial 279, e-mail 280, calendar 281, media player 282, album 283, clock 284, health care (for example, measure exercise quantity or blood sugar), or environment information (for example, atmospheric pressure, humidity, temperature information or the like).

According to an embodiment, the applications 270 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update) at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 270 may include applications (for example, a health care application of a mobile medical appliance or the like) designated according to attributes of the external electronic device 102 or 104. According to an embodiment, the application 270 may include an application received from the external electronic device (for example, the server 106, or the electronic device 102 or 104). According to an embodiment, the applications 270 may include a preloaded application or a third party application which may be downloaded from the server. Names of the elements of the program module 210, according to the above-described embodiments of the present disclosure, may change depending on the type of OS.

According to various exemplary embodiments of the present disclosure, at least some of the program module 210 may be implemented in software, firmware, hardware, or a combination of two or more thereof. At least some of the program module 210 may be implemented (e.g., executed) by, for example, the processor (e.g., the processor 210). At least some of the program module 210 may include, for example, a module, a program, a routine, a set of instructions, and/or a process for performing one or more functions.

Figure 3:
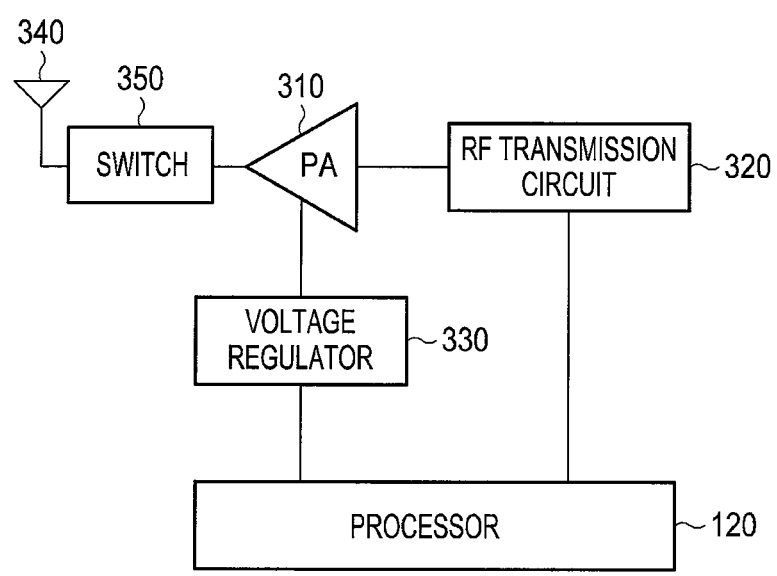
FIG. 3 illustrates a structure of an electronic device according to various embodiments of the present disclosure.

FIG. 3 illustrates a structure of an electronic device according to various embodiments of the present disclosure.

As shown in FIG. 3, the electronic device 101 may include the processor 120, a PA 310, an RF transmission circuit 320, a voltage regulator 330, an antenna 340, and a switch 350. The elements included in the electronic device 101 may be electrically connected to each other.

The antenna 340 may perform RF signal transmission/reception, and may be included within a housing or formed by a part of the housing. The PA 310 may be electrically connected to the antenna 340 through the switch 350.

The RF transmission circuit 320 may be electrically connected to the processor 120 and the PA 310. The RF transmission circuit 320 may convert a signal generated by the processor 120 into an RF signal and transmit the RF signal to the PA 310.

The voltage regulator 330 may provide a PA operation voltage to operate the PA 310. The voltage regulator 330 may supply a PA operation voltage determined by the processor 120 to the PA 310.

The processor 120 may select output power of the PA required when the RF signal is transmitted through the antenna 340. The processor 120 may determine input power of the PA 310 corresponding to the selected output power of the PA by using information on a change in the output power according to a change in the input power of the PA stored in the memory 130.

Further, the processor 120 may control the voltage regulator 330 to determine a PA operation voltage to be supplied to the PA 310 based on the selected output power of the PA and to provide the determined PA operation voltage to the PA 310.

The processor 120 may determine input power of the PA 310 by using at least two data points stored in the memory 130 and a plurality of data points linearly interpolated and generated between the data points. Further, the processor 120 may generate information on a rate of change between the data points generated using data points which have been calibrated and stored in the memory 130 and determine input power by using the generated information on the rate of change.

The processor 120 may control output power of the RF transmission circuit 320 based on the input power of the determined PA 310. The processor 120 may control the determined input power of the PA 310 to be supplied to the PA 310. Since the output power of the PA 310 is determined by the processor 120, the RF transmission circuit 320, and a gain of the PA 310, the processor 120 may control each element included in the electronic device 101 such that the determined input power of the PA 310 is supplied to the PA 310. For example, the electronic device 101 may adjust a code value for controlling each element to supply the determined input power of the PA 310 to the PA 310.

Figure 4:
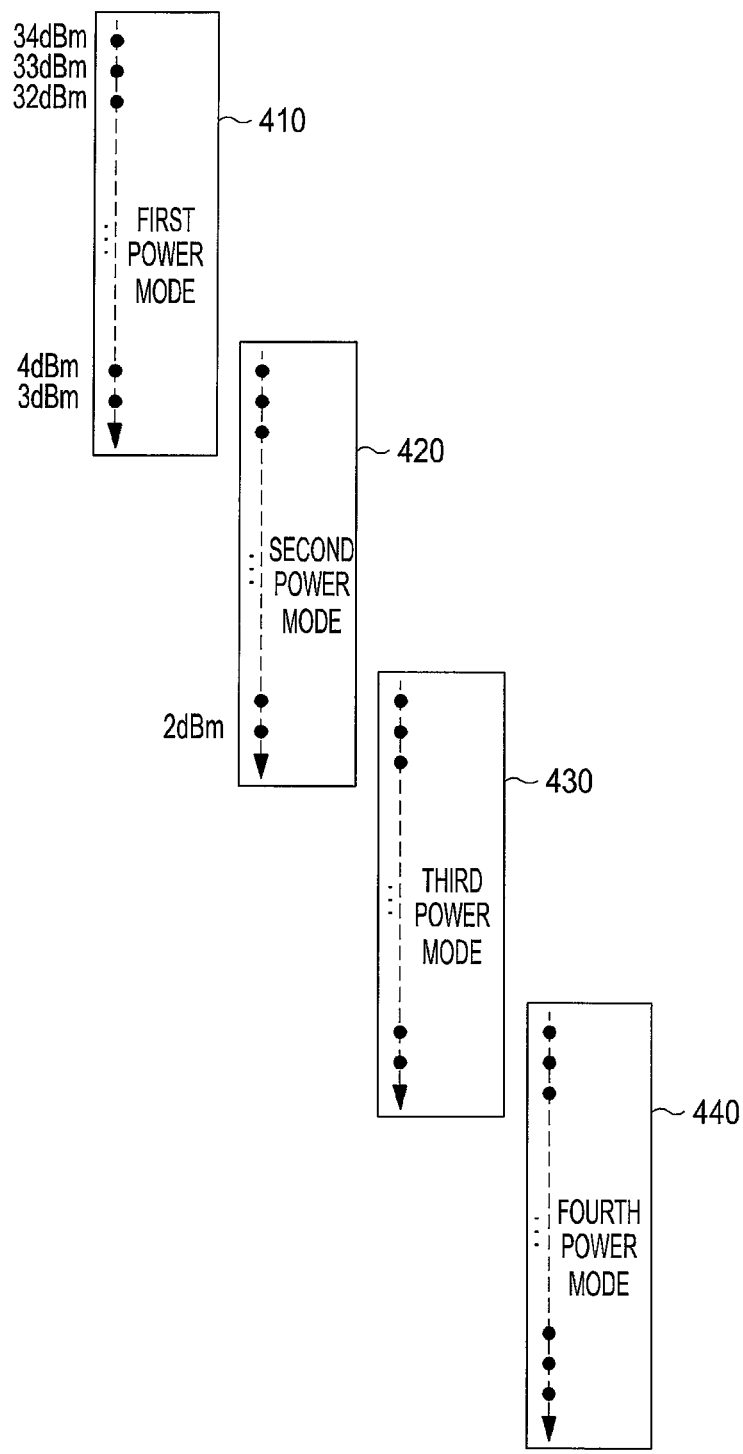
FIG. 4 illustrates a method of performing a calibration for a power amplifier (PA) according to various embodiments of the present disclosure.

FIG. 4 illustrates a method of performing a calibration for a PA according to various embodiments of the present disclosure.

Through the method of performing the calibration for the PA according to the comparative example, the calibration may be performed by measuring output power while changing input power set according to each power mode in the unit of codes (for example, 1 dBm).

As illustrated in FIG. 4, in accordance with a first power mode 410, the calibration may be performed by measuring output power for input powers set on the first power mode 410 based on characteristics of the PA. Also, with respect to a second power mode 420, a third power mode 430, and a fourth power mode 440, the calibration may be performed in the same way as that of the first power mode 410 by changing input powers set according to each power mode in the unit of codes based on the characteristics of the PA or user settings. Information on the input power corresponding to the output power set according to each power mode may be acquired through a process of performing the calibration.

As described above, by performing the calibration for the input powers set according to each of all power modes, it took quite a bit of time to perform the calibration and a large amount of data on a result of the calibration had to be stored.

Further, since input power corresponding to output power which is included in a range of the output power set according to each power mode of the PA but has not been calibrated is determined based on input power corresponding to the output power which has been calibrated, accurate input power could not be determined. Accordingly, when the output power, which has not been calibrated, is selected as the output power for RF signal transmission, input power corresponding to the selected output power cannot be accurately determined.

Figure 5:
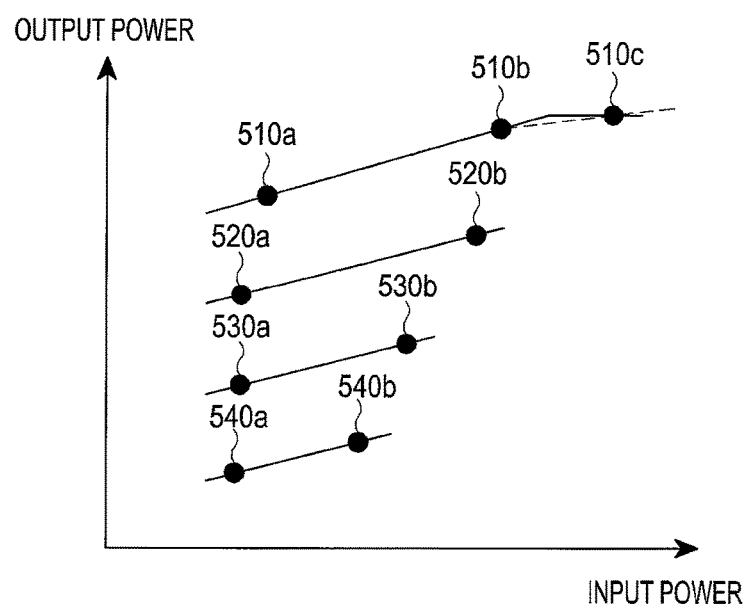
FIG. 5 illustrates a graph of a relationship between input power and output power according to each power mode of the PA according to various embodiments of the present disclosure.

FIG. 5 illustrates a graph of a relationship between input power and output power according to each power mode of a PA according to various embodiments of the present disclosure. For example, the input power and output power corresponding to a plurality of power modes of the PA included in the electronic device 101. The electronic device 101 may control the PA to operate in one of the plurality of power modes set based on characteristics of the PA. For example, the electronic device 101 may identify a power mode corresponding to output power required when an RF signal is transmitted among the plurality of power modes. The electronic device 101 may control the PA to operate in the power mode corresponding to the output power. The plurality of power modes may be determined based on the characteristics of the PA. In FIG. 5, it is assumed that the PA may operate in four power modes. The power modes may be divided into a first power mode, a second power mode, a third power mode, and a fourth power mode according to the size of power which may be supplied.

In each power mode, information (for example, slope information) on a rate of change between the input power and output power may be the same according to the characteristics of the PA. Accordingly, the relationship between the input power and the output power may be linear in every mode as illustrated in the graph of FIG. 5. However, in the first power mode that supplies the highest power among the plurality of power modes, there may be a non-linear interval having a non-linear relationship between the input power and the output power in order to output the maximum power which may be output by the PA.

In the conventional art, output power had to be measured for calibration with respect to all input powers set according to each power mode. Accordingly, calibration time was long and a large amount of calibration result data had to be stored in the memory. Further, in order to determine input power corresponding to output power which has not been calibrated, an additional calibration had to be performed, which caused inconvenience.

In contrast, according to various embodiments of the present disclosure, the calibration may be performed only for two input powers rather than all input powers with respect to each power mode. The electronic device 101 may determine input powers corresponding to all output powers by using the calibration result of the two input powers.

As described above, in each power mode, the relationship between the input power and the output power may be linearly expressed, so that the electronic device 101 may determine input power corresponding to output power, which has not been calibrated, by using the linear relationship between the input power and the output power.

Although FIG. 5 illustrates acquisition of only two data points during the linear interval in each power mode, it is merely an example for the purpose of description and the present disclosure is not limited thereto. That is, at least two data points are needed to determine the input power in each power mode, and the input power may be determined using two or more data points. Accordingly, two or more data points may be acquired according to the characteristics of the PA and settings in the calibration and stored in the memory 130 of the electronic device 101.

Referring to FIG. 5, with respect to the first power mode, three data points 510a, 510b, and 510c may be stored. As described above, in the first power mode that supplies the highest power among the plurality of power modes of the PA, the non-linear interval may exist. In the non-linear interval, the input power is determined in a different way from that of the linear interval, the data point 510c corresponding to the non-linear interval may be stored in addition to the data points 510a and 510b corresponding to the linear interval. According to an embodiment, in the power mode having the non-linear interval, at least one of the data points of the linear interval may be close to the non-linear interval.

With respect to the second power mode, the third power mode, and the fourth power mode, two data points 520a, 520b, 530a, 530b, 540a, and 540b may be stored, respectively.

The electronic device 101 may determine input powers corresponding to all output powers which may be output through each power mode by using two data points stored in the memory 130 in accordance with each power mode.

For example, the electronic device 101 may generate a plurality of data points by being linearly interpolated using the two data points in each power mode. The electronic device 101 may determine input power by using at least one of the two data points and the plurality of data points in each power mode.

Further, the electronic device 101 may determine input power corresponding to the output power by generating information on a rate of change between the two data points in each power mode and applying the generated information on the rate of change to between the two data points. Since the two data points have the linear characteristics described above, the electronic device 101 may determine input power corresponding to the output power by using the linear characteristics.

However, as described above, the non-linear interval having the non-linear relationship between the input power and the output power may exist in the first power mode. Accordingly, the electronic device 101 may determine input powers corresponding to all output powers which may be output through the first power mode by using the two data points 510a and 510b corresponding to the linear interval and the one data point 510c corresponding to the non-linear interval in accordance with the first power mode.

As described above, the electronic device 101 may determine the input powers corresponding to all the output powers which may be output in each power mode through a minimal calibration for each power mode.

Figure 6A:
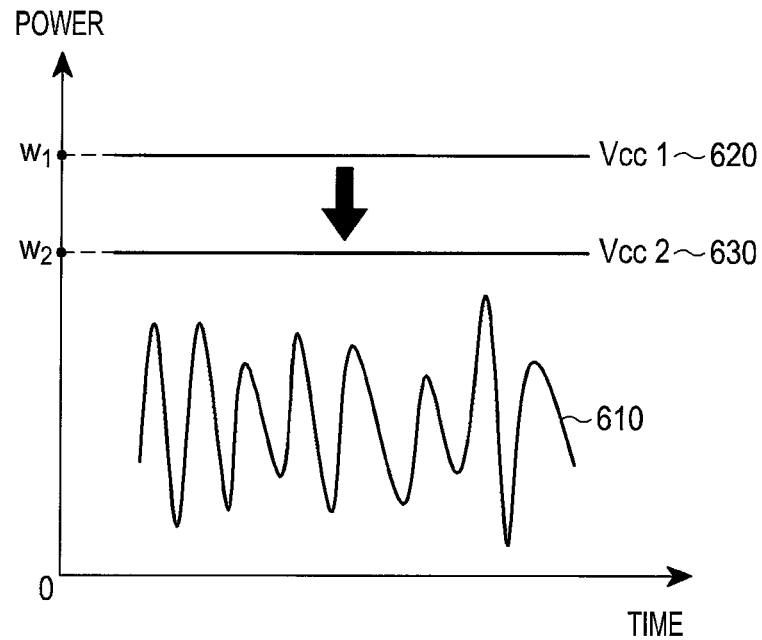
FIG. 6A illustrates a method of regulating a PA operation voltage according to various embodiments of the present disclosure.

FIG. 6A illustrates a method of regulating a PA operation voltage according to various embodiments of the present disclosure.

The PA according to various embodiments of the present disclosure may amplify and output power of an RF signal to transmit the RF signal. In order to allow the PA to amplify power of the RF signal, a predetermined PA operation voltage may be supplied to the PA. As described above, power is consumed according to the operation of the PA. When the electronic device 101 including the PA operates through a limited capacity power supply such as a battery, it is required to reduce power consumption of the PA.

The power consumption of the PA may be reduced by reducing the PA operation voltage supplied to the PA. However, the operation voltage of the PA may be regulated within a range that does not influence the operation of the PA.

In FIG. 6A, it is assumed that an RF signal having a maximum of first power W1 may be output through the PA when Vcc1 620 is supplied to the PA as the PA operation voltage, and an RF signal having a maximum of second power W2 may be output through the PA when Vcc2 630, which is a voltage lower than Vcc1 620, is supplied to the PA as the PA operation voltage. Further, it is assumed that maximal power of the RF signal 610 output through the PA is lower than the second power W2 and Vcc1 620 is currently set as the PA operation voltage.

In this case, the RF signal 610 may be output through the PA although Vcc2 630 is set as the PA operation voltage and supplied to the PA. When Vcc1 620 is set as the PA operation voltage and supplied to the PA, unnecessary power consumption may be generated in the PA. Accordingly, in order to reduce power consumed in a process of outputting the RF signal 610, the PA operation voltage is required to be reset as Vcc2 630 rather than the currently set Vcc1 620.

As described above, in a process of performing the calibration for the PA, the PA operation voltage may be differently set to reduce power consumed by the PA according to output power required for transmission of the RF signal 610. The PA operation voltage may be set according to each power mode based on characteristics of the PA. As described above, by regulating the PA operation voltage, the power consumed by the PA may be reduced.

Figure 6B:
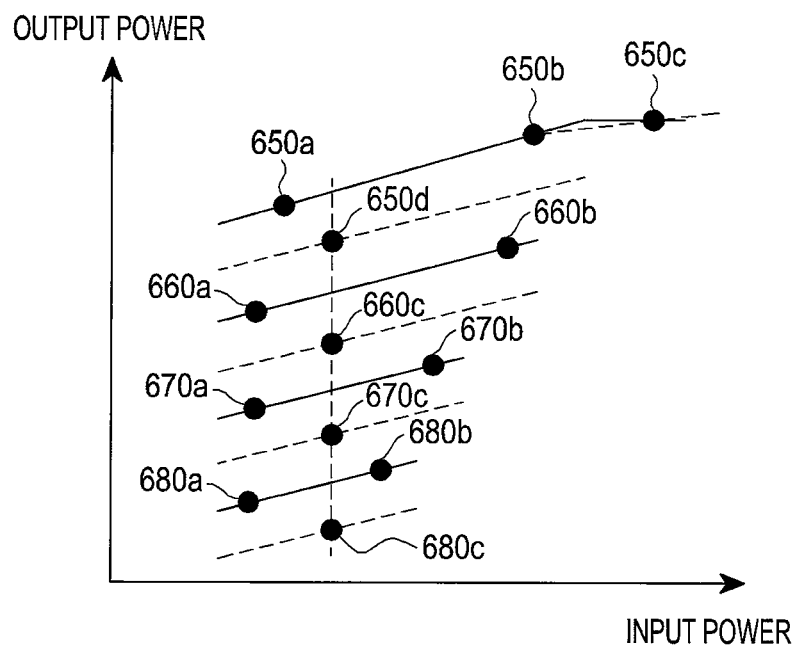
FIG. 6B illustrates a graph of a relationship between input power and output power according to each power mode and each PA operation voltage according to various embodiments of the present disclosure.

FIG. 6B illustrates a graph of a relationship between input power and output power according to each power mode and each PA operation voltage according to various embodiments of the present disclosure. For example, the input power and output power corresponding to each of a plurality of PA operation voltages set for each of a plurality of power modes of the PA included in the electronic device 101. In order to reduce the power consumed by the PA, the plurality of PA operation voltages may be set for each of the plurality of power modes based on characteristics of the PA.

In FIG. 6B, it is assumed that two PA operation voltages are set in each power mode. Further, it is assumed that two data points are stored in accordance with a first PA operation voltage to generate information on a rate of change between input power and output power and one data point is stored in accordance with a second PA operation voltage in each power mode. The second PA operation voltage may be a PA operation voltage regulated to reduce the power consumed by the PA based on the characteristics of the PA.

As described in FIG. 5, since the non-linear interval may exist in the first power mode that supplies the highest power, one data point 650c corresponding to the non-linear interval may be additionally stored in accordance with the first PA operation voltage set on the first power mode.

Accordingly, as described in FIG. 5, in accordance with a first PA operation voltage of the first power mode, two data points 650a and 650b corresponding to the linear interval and one data point 650c corresponding to the non-linear interval may be stored.

Further, two data points 660a and 660b may be stored in accordance with a first PA operation voltage of a second power mode, two data points 670a and 670b may be stored in accordance with a first PA operation voltage of a third power mode, and two data points 680a and 680b may be stored in accordance with a reference PA operation voltage of a fourth power mode.

In addition, in accordance with the second PA operation voltage set according to each power mode, input power may be determined using only one data point. Since information on a rate of change between input power and output power is the same according to each power mode, information on a rate of change between input power and output power generated using two data points corresponding to the first PA operation voltage may be applied to one data point stored in accordance with the second PA operation voltage. Accordingly, even though only one data point is stored in accordance with the second PA operation voltage, input power corresponding to the output power may be determined.

Therefore, as illustrated in FIG. 6B, one data point 650d may be stored in accordance with the second PA operation voltage of the first power mode, one data point 660c may be stored in accordance with the second PA operation voltage of the second power mode, one data point 670c may be stored in accordance with the second PA operation voltage of the third power mode, and one data point 680c may be stored in accordance with the second PA operation voltage of the fourth power mode. The one data point according to each power mode may be acquired to correspond to output power lower than the output power corresponding to at least two data points.

As described above, the electronic device 101 may determine the input powers corresponding to all the output powers which may be output in each power mode through a minimal calibration for each of a plurality of PA operation voltages set for each power mode.

Figure 7:
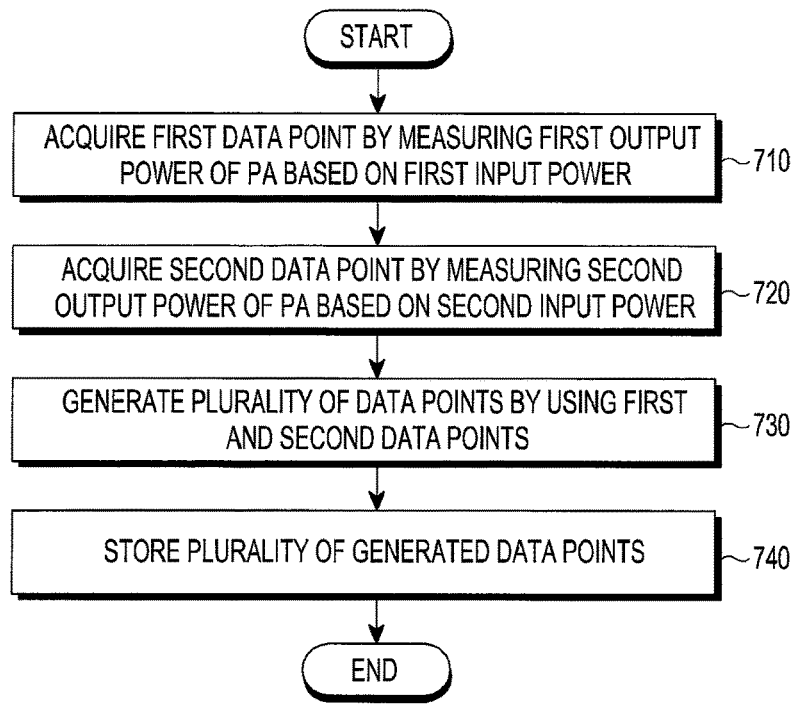
FIG. 7 illustrates a method of manufacturing an electronic device according to various embodiments of the present disclosure.

FIG. 7 illustrates a method of manufacturing an electronic device according to various embodiments of the present disclosure.

Data points, which are stored in the memory 130, used for determining input power corresponding to output power of the PA required for RF signal transmission may be acquired through the calibration performed in a manufacturing process of the electronic device 101. A method of acquiring the data points and generating and storing a plurality of data points and information on a rate of change between the plurality of data points by using the acquired data points in the manufacturing process of the electronic device 101 may be performed as described below.

In operation 710, the electronic device 101 may apply first input power to the PA and measure first output power of the PA based on the first input power, so as to acquire a first data point.

In operation 720, the electronic device 101 may apply second input power to the PA and measure second output power of the PA based on the second input power, so as to acquire a second data point.

To make output power of a PA included in another electronic device the same as the first output power and the second output power as the first input power and the second input power are applied to the PA in operations 710 and 720, settings of each element included in the electronic device 101 may be calibrated.

In operation 730, the electronic device 101 may linearly interpolate and generate a plurality of data points by using the first data point and the second data point.

In operation 740, the electronic device 101 may store the plurality of generated data points in the memory 130. As described above, in the calibration performed in the manufacturing process, the electronic device 101 may acquire and store only the first data point and the second data point, so that calibration time may be reduced. Further, the electronic device 101 may determine input powers corresponding to all output powers which may be output through the PA by using a plurality of data points generated using the first data point and the second data point acquired when the calibration is performed.

According to an embodiment, the electronic device 101 may generate information on a rate of change between the first data point and the second data point rather than between the plurality of data points in operation 730, and may store the information on the rate of change in operation 740. The electronic device 101 may determine input powers corresponding to all output powers, which may be output through the PA, through the generated information on the rate of change.

According to an embodiment, the electronic device 101 may not perform operations 730 and 740. The electronic device 101 may store only the first data point and the second data point, which are acquired when the calibration is performed, in the memory 130. Accordingly, when an RF signal is transmitted, the electronic device 101 may generate the information on the rate of change by using the first data point and the second data and determine input power by using the generated information on the rate of change.

Figure 8:
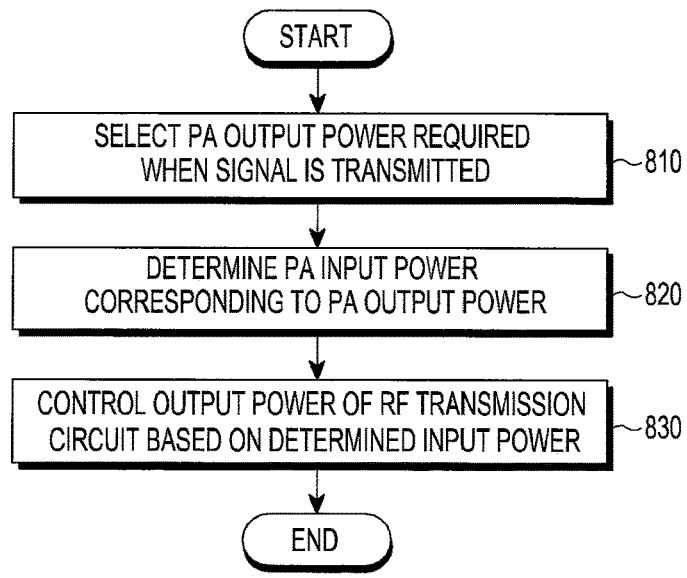
FIG. 8 illustrates an operation method of an electronic device to transmit an RF signal according to various embodiments of the present disclosure.

FIG. 8 illustrates an operation method of an electronic device to transmit an RF signal according to various embodiments of the present disclosure.

In operation 810, the electronic device 101 may select output power of the PA required when the RF signal is transmitted. The electronic device 101 may select the output power of the PA based on characteristics of the network connected to the electronic device 101.

In operation 820, the electronic device 101 may determine input power of the PA corresponding to the selected output power of the PA by using information on a change in the output power according to a change in the input power of the PA stored in the memory 130.

For example, the electronic device 101 may determine input power corresponding to PA output power through a data point corresponding to the selected PA output power among data points included in the information on the change in the output power according to the change in the input power of the PA stored in the memory 130.

Further, the electronic device 101 may calculate the input power corresponding to the PA output power by using the data points and determine the calculated input power as the input power corresponding to the PA output power.

In operation 830, the electronic device 101 may control output power of the RF transmission circuit based on the determined input power of the PA. Accordingly, the electronic device 101 may control the determined input power of the PA to be supplied to the PA.

Figure 9:
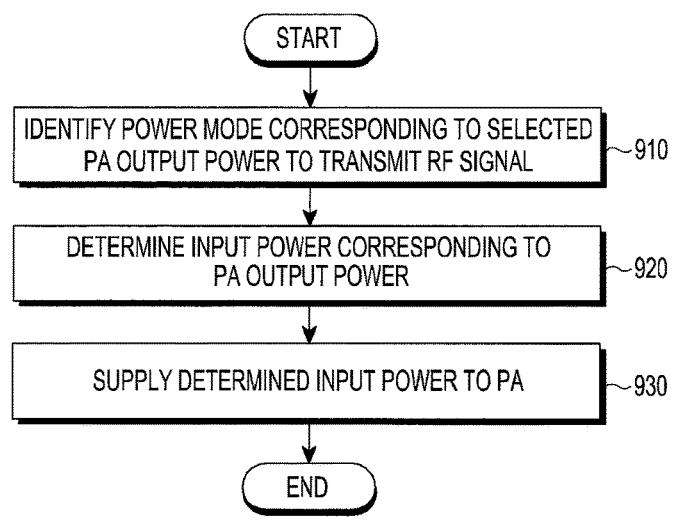
FIG. 9 illustrates a method of supplying power to a PA for RF signal transmission by an electronic device according to various embodiments of the present disclosure.

FIG. 9 illustrates a method of supplying power to a PA for RF signal transmission by an electronic device according to various embodiments of the present disclosure.

In operation 910, for the RF signal transmission, the electronic device 101 may select a power mode corresponding to the selected output power of the PA among a plurality of power modes. When the calibration is performed according to each of the plurality of power modes of the PA and the information on the change in the output power according to the change in the input power is stored according to each of the plurality of power modes of the PA, the electronic device 101 may select the power mode corresponding to the output power of the PA in order to determine input power of the PA.

In operation 920, the electronic device 101 may determine input power corresponding to the output power by using stored information on at least two data points corresponding to the selected power mode.

For example, the electronic device 101 may determine the input power corresponding to the output power by applying information on a rate of change between at least two data points to at least one of at least two data points.

The information on the rate of change may be generated by the electronic device 101 in advance using at least two data points and stored in the memory 130. In this case, the electronic device 101 may determine the input power by using the information on the rate of change stored in the memory 130.

Further, the information on the rate of change may be generated by the electronic device 101 when the RF signal is transmitted. In this case, the electronic device 101 may further perform a separate operation for generating the information on the rate of change by using at least two data points stored in the memory 130 when the RF signal is transmitted.

In operation 930, the electronic device 101 may supply the determined input power to the PA. As the determined input power is supplied to the PA, the output power of the PA selected for the RF signal transmission may be output by the PA.

Figure 10:
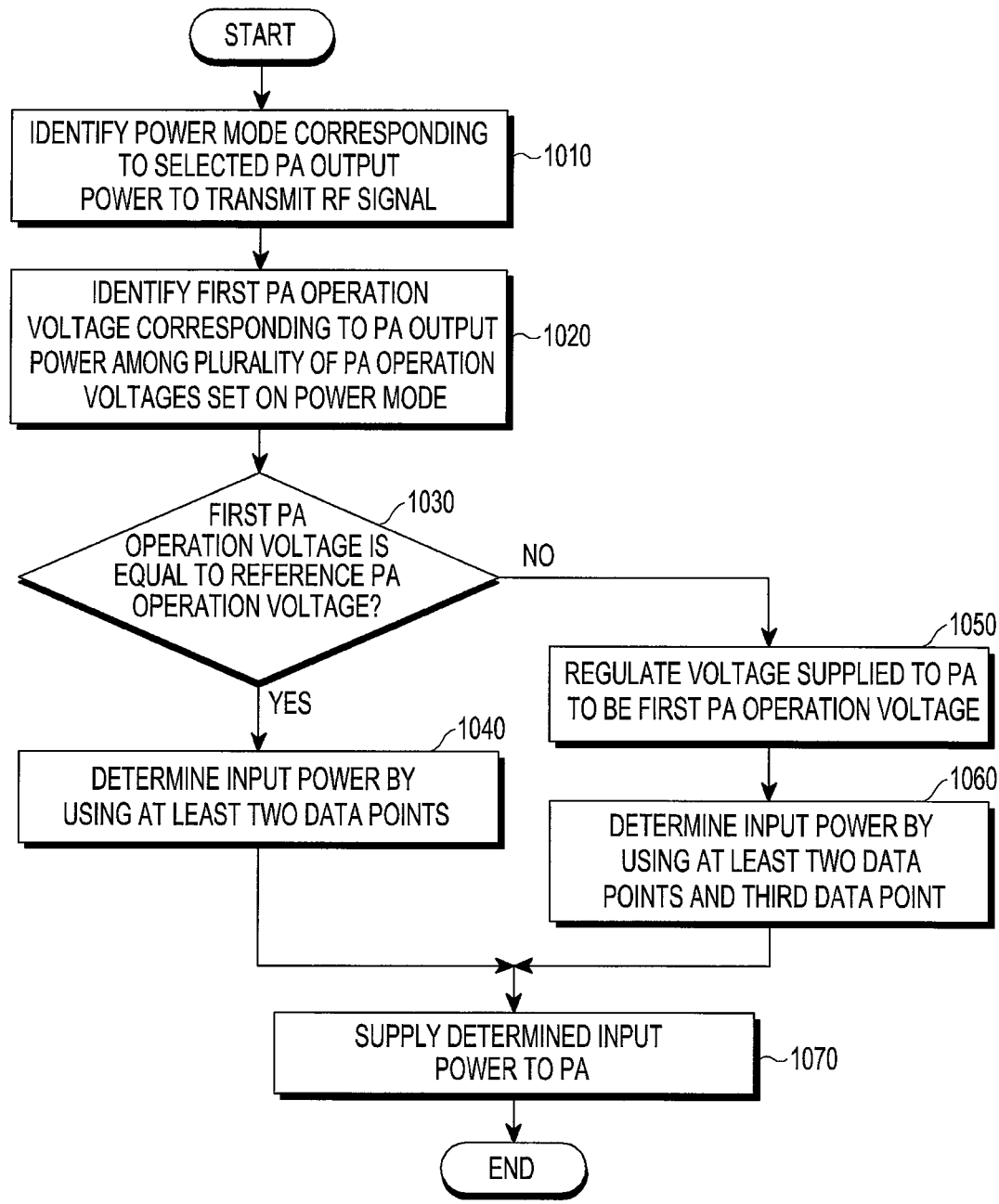
FIG. 10 illustrates a method of determining input power when a PA operation voltage is regulated by an electronic device according to various embodiments of the present disclosure.

FIG. 10 illustrates a method of determining input power when a PA operation voltage is regulated by an electronic device according to various embodiments of the present disclosure.

In operation 1010, the electronic device 101 may select a power mode corresponding to the output power of the PA selected the RF signal transmission.

When the information on the change in the output power according to the change in the input power is stored according to each of a plurality of PA operation voltages set for each of a plurality of power modes of the PA, the electronic device 101 may identify a first PA operation voltage corresponding to the output power of the PA among a plurality of PA operation voltages set on the selected power mode in operation 1020.

In operation 1030, the electronic device 101 may identify whether the first PA operation voltage is the same as the reference PA operation voltage used when at least two data points are acquired.

In accordance with the reference PA operation voltage, at least two data points may be stored. Information on a rate of change between the input power and the output power may be generated using at least two data points corresponding to the reference PA operation voltage.

When the first PA operation voltage is the same as the reference PA operation voltage, the electronic device 101 may determine the input power by using at least two data points corresponding to the reference PA operation voltage in operation 1040.

When the first PA operation voltage is different from the reference PA operation voltage, the electronic device 101 may regulate the voltage which is supplied to the PA as the first PA operation voltage in operation 1050. In order to reduce power consumed by the PA, the electronic device 101 may regulate the voltage supplied to the PA to be the first PA operation voltage.

In operation 1060, the electronic device 101 may determine the input power of the PA by further using at least two data points and information on at least one third data point stored in the memory 130 in operation 1060.

The electronic device 101 may determine the input power of the PA by using characteristics of the PA in which the information on the rate of change between the input power and the output power is equally set in one power mode.

For example, the electronic device 101 may determine the input power of the PA corresponding to the selected output power of the PA by applying information (for example, slope information) on a rate of change between at least two first data points to at least one third data point.

In operation 1070, the electronic device 101 may supply the determined input power to the PA. As the determined input power is supplied to the PA, the output power of the PA selected for the RF signal transmission may be output by the PA.

According to various embodiments of the present disclosure, a method of operating an electronic device to transmit an RF signal may include an operation of selecting output power of a PA included in the electronic device, which is required when a signal is transmitted through an antenna included in the electronic device, an operation of determining input power of the PA corresponding to the output power of the PA by using at least one of a first data point, a second data point, or a plurality of data points stored in a memory included in the electronic device, and an operation of controlling output power of an RF transmission circuit included in the electronic device based on the input power, wherein the plurality of data points may be generated by being linearly interpolated between the first data point and the second data point.

According to various embodiments of the present disclosure, the first data point, the second data point, and the plurality of data points may be stored according to each of a plurality of power modes of the PA set based on characteristics of the PA.

According to various embodiments of the present disclosure, the method may further include an operation of identifying a first power mode corresponding to the selected output power of the PA among the plurality of power modes of the PA.

According to various embodiments of the present disclosure, the operation of determining the input power of the PA may determine the input power of the PA corresponding to the output power of the PA by using at least one of the first data point, the second data point, or the plurality of data points stored in the memory in accordance with the first power mode.

According to various embodiments of the present disclosure, the operation of determining the input power of the PA may include an operation of identifying a third data point corresponding to the output power of the PA among the first data point, the second data point, or the plurality of data points corresponding to the first power mode and an operation of determining input power corresponding to the third data point as the input power of the PA when the third data point is identified.

According to various embodiments of the present disclosure, in the method, the operation of determining the input power of the PA may include an operation of determining the input power of the PA based on a rate of change between the first data point and the second data point when the third data point is not identified.

According to various embodiments of the present disclosure, the first data point, the second data point, or the plurality of data points may be stored according to each of a plurality of PA operation voltages set for each of a plurality of power modes of the PA set based on characteristics of the PA.

According to various embodiments of the present disclosure, the method may further include an operation of identifying a first power mode corresponding to the selected output power of the PA among the plurality of power modes of the PA and an operation of identifying a first PA operation voltage corresponding to the selected output power of the PA among the plurality of PA operation voltages set on the first power mode.

According to various embodiments of the present disclosure, the method may further include an operation of supplying a voltage corresponding to the identified first operation voltage to the PA.

According to various embodiments of the present disclosure, the operation of determining the input power of the PA may determine the input power of the PA corresponding to the output power of the PA by using at least one of the first data point, the second data point, and the plurality of data points stored in the memory in accordance with the first PA operation voltage.

Figure 11:
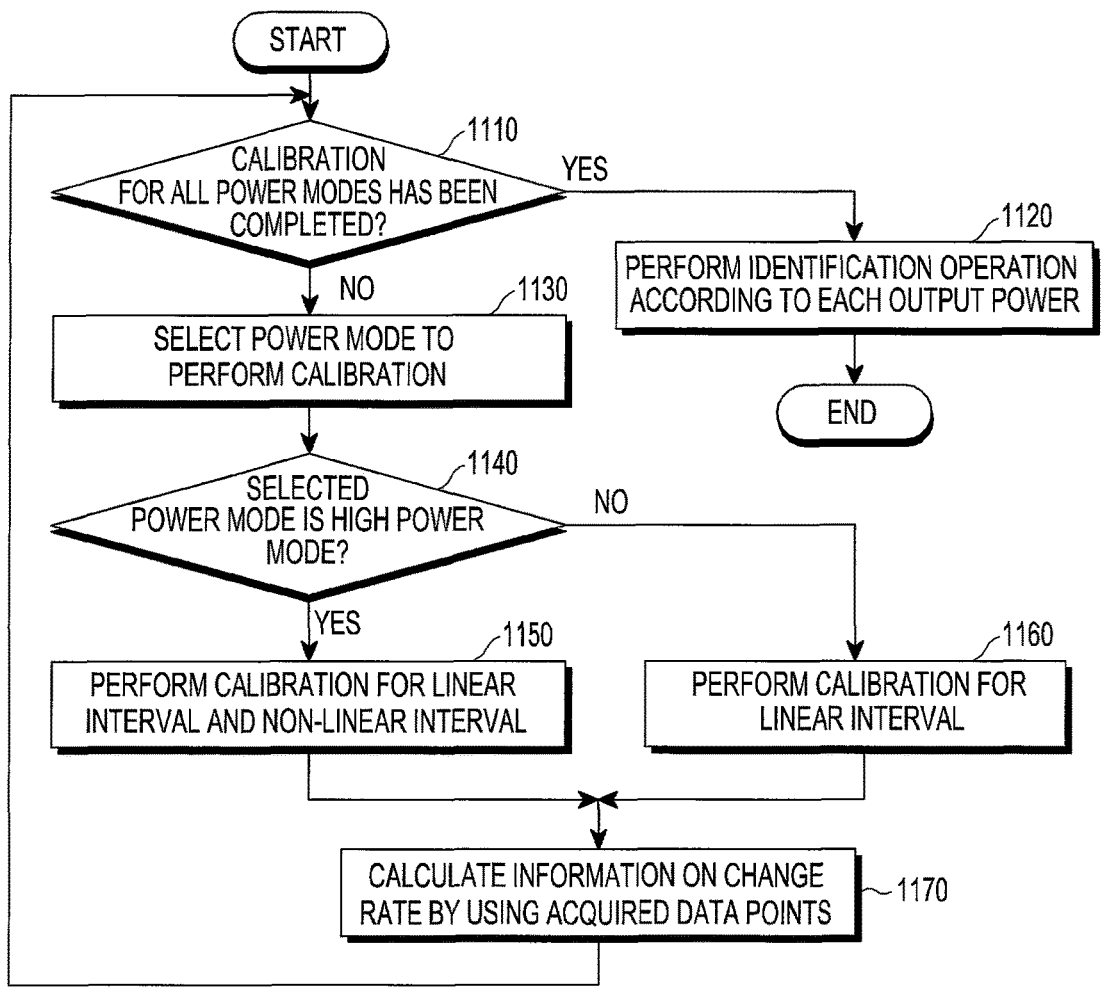
FIG. 11 illustrates a method of performing a calibration for a PA according to various embodiments of the present disclosure.

FIG. 11 illustrates a method of performing a calibration for a PA according to various embodiments of the present disclosure.

Figure 12:
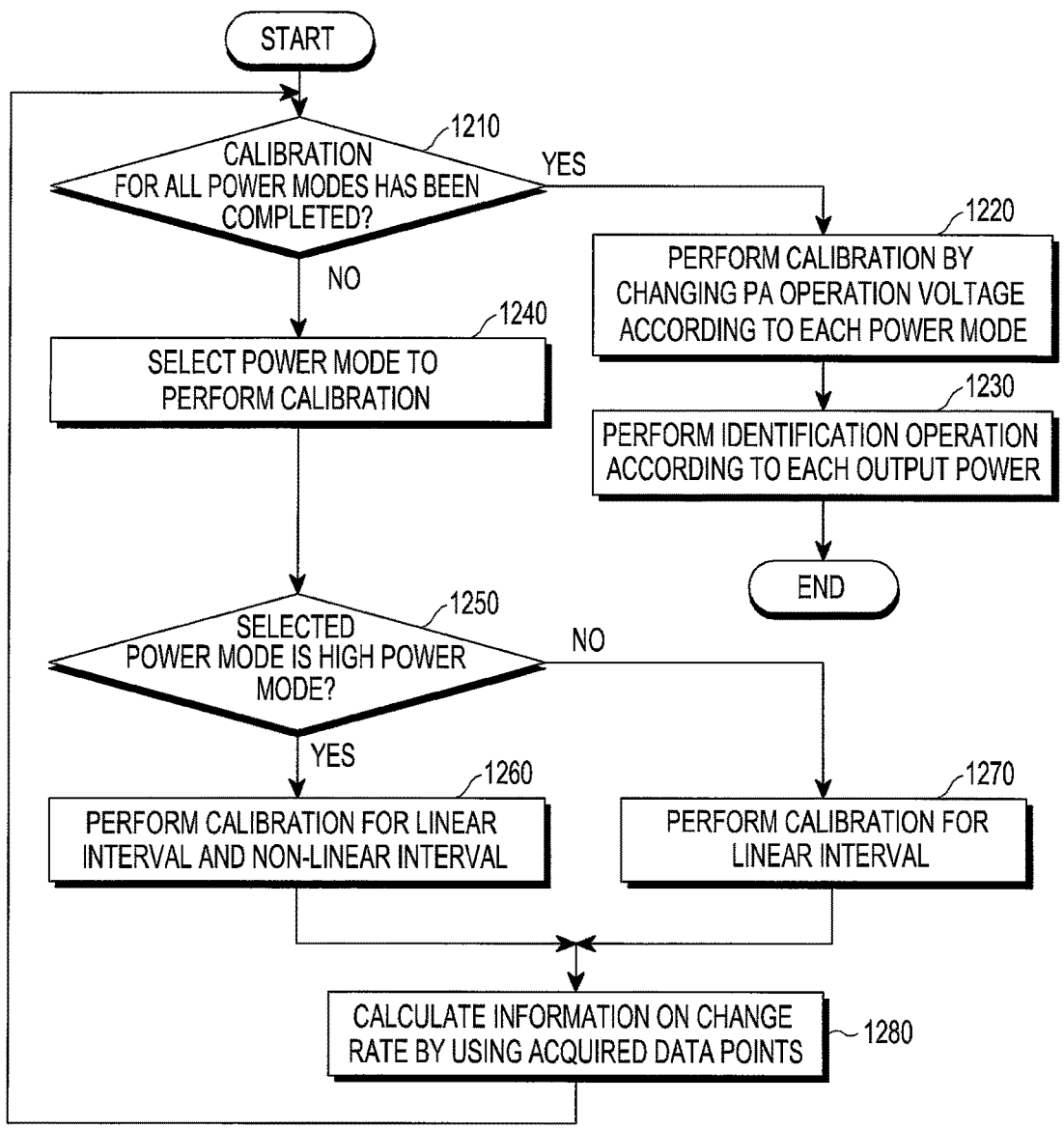
FIG. 12 illustrates a method of performing a calibration for a PA according to various embodiments of the present disclosure.

FIGS. 11 and 12 illustrate the method of performing the calibration for a PA. The calibration for the PA may be performed in a state where the PA, the electronic device 101, and a first electronic device that performs the calibration are connected to each other. The electronic device 101 may acquire output power acquired as the calibration is performed and at least two data points for input power corresponding to the output power from the first electronic device.

In operation 1110, the first electronic device may identify whether the calibration for all power modes of the PA has been completed. As described above, the PA may operate in one of the plurality of power modes set based on the characteristics of the PA. Accordingly, the calibration may be performed for all the power modes of the PA.

When the calibration for all the power modes of the PA has been completed, the first electronic device may perform an operation of identifying input power corresponding to each output power of the PA by using data points acquired through the calibration. For example, the input power corresponding to each of the output power of the PA may be identified using a linear relationship between the data points acquired through the calibration in operation 1120. Accordingly, the first electronic device may identify whether the input power determined for each of the identified output power of the PA is properly determined and transmit information on the input power determined for each of the output power of the PA to the electronic device 101.

Further, according to an embodiment, operation 1120 may not be performed. The first electronic device having performed the calibration may transmit only at least two data points acquired through calibration to the electronic device 101.

When the calibration for all the power modes has not been completed, the first electronic device may select a power mode to perform the calibration in operation 1130.

The first electronic device may identify whether the selected power mode is a high power mode that provides the highest power among the plurality of power modes of the PA in operation 1140. A non-linear interval may exist in the high power mode according to the characteristics of the PA in order to output the maximum power which may be output by the PA. Further, in the non-linear interval, the input power is determined in a different way from that of the linear interval, so that a separate calibration for the non-linear interval is needed.

When the selected power mode is the high power mode, the first electronic device may perform the calibration for both the linear interval and the non-linear interval set according to the characteristics of the PA in operation 1150.

When the selected power mode is not the high power mode, the non-linear interval does not exist, so that the first electronic device may perform the calibration only for the linear interval in operation 1160.

The calibration performed in operations 1150 and 1160 may be performed by applying at least two input powers to the PA and measuring output power output by the PA for at least two applied input powers. In order to make the measured output power the same as output power, which is output as at least two input powers are applied to a PA of another electronic device, settings of each element included in the electronic device 101 may be calibrated. The first electronic device may transmit output power acquired through the calibration of the settings of each element and data points for input power corresponding to the output power to the electronic device 101.

In operation 1170, the first electronic device may calculate information on the rate of change between the data points by using at least two data points acquired through the calibration. The information on the rate of change may include information on an amount of change of input power corresponding to each of the data points and information on an amount of change of output power. For example, the information on the rate of change may include slope information indicating the amount of change of the output power with respect to the amount of change of the input power as shown in Equation (1) below.

$$m = \frac{O_2 - O_1}{I_2 - I_1} \quad (1)$$

In equation (1), m denotes information (for example, slope information) on a rate of change, I1 denotes input power corresponding to the first data point, I2 denotes input power corresponding to the second data point, O1 denotes output power corresponding to the first data point, and O2 denotes output power corresponding to the second data point.

The first electronic device may transmit the information on the rate of change calculated through operation 1170 along with the acquired data points to the electronic device 101. The electronic device 101 may use the data points and information on a rate of change stored in the memory 130 in order to determine input power corresponding to output power of the PA required when the RF signal is transmitted.

Further, according to an embodiment, operation 1170 may not be performed. The first electronic device may transmit only at least two data points acquired through the calibration to the electronic device 101. In this case, when the RF signal is transmitted, the electronic device 101 may calculate the information on the rate of change by using the data points in order to determine the input power corresponding to the output power of the PA. The electronic device 101 may determine the input power by using the calculated rate of change.

FIG. 12 illustrates a method of performing a calibration for a PA according to various embodiments of the present disclosure.

In operation 1210, the first electronic device may identify whether the calibration for all power modes of the PA has been completed. As described above, the PA may operate in one of the plurality of power modes set based on the characteristics of the PA. Accordingly, the calibration may be performed for all the power modes of the PA.

In operation 1220, the first electronic device may perform the calibration for at least one input power by changing the reference PA operation voltage, which is supplied to the PA when the calibration is performed, according to each power mode. Further, the first electronic device may perform the calibration by further changing the PA operation voltage according to each power mode. The changed PA operation voltages may be set in a range that does not influence output power for RF signal transmission according to characteristics of the PA.

For example, the first electronic device may perform the calibration by changing the PA operation voltage into Vcc1 with respect to the first power mode. Further, in order to reduce power consumed by the PA, the first electronic device may further perform the calibration for an additional PA operation voltage determined according to the characteristics of the PA to supply a PA operation voltage optimized for each output power. For example, the first electronic device may further perform an additional calibration by changing the PA operation voltage into Vcc2 which is different from Vcc1. In addition, the first electronic device may further perform an additional calibration by variously changing the PA operation voltage according to the characteristics of the PA. With respect to the other power modes except for the first power mode, the calibration may be further performed by changing or adding the PA operation voltage in the same way.

As described above, when at least one data point is acquired through the calibration for at least one input power, information on a rate of change between at least two data points acquired through the calibration of reference PA operation power may be applied to at least one data point to determine input power. When PA operation voltages are different, gains may be different even in the same power mode of the PA, but information on a rate of change is the same. Accordingly, information on a rate of change between at least two data points acquired in the reference PA operation power may be applied to at least one data point acquired through the change in the PA operation voltage.

When the calibration for all the power modes of the PA has been completed, the first electronic device may perform an operation of identifying input power corresponding to each output power of the PA and each PA operation voltage by using data points acquired through the calibration in operation 1230. For example, the input power corresponding to each output power of the PA and each PA operation voltage may be identified using a linear relationship between the data points acquired through the calibration. Accordingly, the first electronic device may identify whether the input power determined according to each of the identified output power of the PA is properly determined, and transmit information on the input power determined according to each PA output power and each PA operation voltage to the electronic device 101.

Further, according to an embodiment, operation 1230 may not be performed. The first electronic device having performed the calibration may transmit only data points to the electronic device 101 through the performance of the calibration.

When the calibration for all the power modes has not been completed, the first electronic device may select a power mode to perform the calibration in operation 1240.

The first electronic device may identify whether the selected power mode is a high power mode that provides the highest power among the plurality of power modes of the PA in operation 1250. A non-linear interval may exist in the high power mode according to the characteristics of the PA in order to output the maximum power which may be output by the PA. Further, in the non-linear interval, the input power is determined in a different way from that of the linear interval, so that a separate calibration for the non-linear interval is needed.

When the selected power mode is the high power mode, the first electronic device may perform the calibration for the linear interval and the non-linear interval set according to the characteristics of the PA in operation 1260.

When the selected power mode is not the high power mode, the non-linear interval does not exist, so that the first electronic device may perform the calibration only for the linear interval in operation 1270.

In operation 1280, the first electronic device may calculate information on the rate of change between the data points by using the data points acquired through the calibration.

Further, according to an embodiment, operation 1280 may not be performed. The first electronic device may transmit only at least two data points acquired and stored in the memory 130 through the calibration to the electronic device 101. In this case, when the RF signal is transmitted, the electronic device 101 may calculate the information on the rate of change by using the data points in order to determine the input power corresponding to the output power of the PA. The electronic device 101 may determine the input power by using the calculated rate of change.

As described above, the first electronic device may perform the calibration with respect to not all the set input powers. The electronic device 101 may determine input power corresponding to the output power of the PA by using at least two data points received from the first electronic device. The electronic device 101 may determine the input power corresponding to the output power of the PA by using linearity between data points according to the information on the rate of change between at least two data points.

According to various embodiments of the present disclosure, a method of manufacturing an electronic device comprising a housing, an antenna included within the housing or formed by a part of the housing, a power amplifier (PA) electrically connected to the antenna, a radio frequency (RF) transmission circuit electrically connected to the power amplifier, a processor electrically connected to the RF transmission circuit and the PA, and a memory electrically connected to the processor is provided. The method may include an operation of acquiring a first data point by applying first input power to the PA and measuring first output power of the PA based on the first input power, an operation of acquiring a second data point by applying second input power to the PA and measuring second output power of the PA based on the second input power, an operation of linearly interpolating and generating a plurality of data points by using the first and second data points, and an operation of storing the plurality of data points in the memory.

According to various embodiments of the present disclosure, the first data point, the second data point, and the plurality of data points may be stored according to each of a plurality of power modes of the PA set based on characteristics of the PA.

According to various embodiments of the present disclosure, the first data point, the second data point, or the plurality of data points may be stored according to each of a plurality of PA operation voltages set for each of a plurality of power modes of the PA set based on characteristics of the PA.

Figure 13:
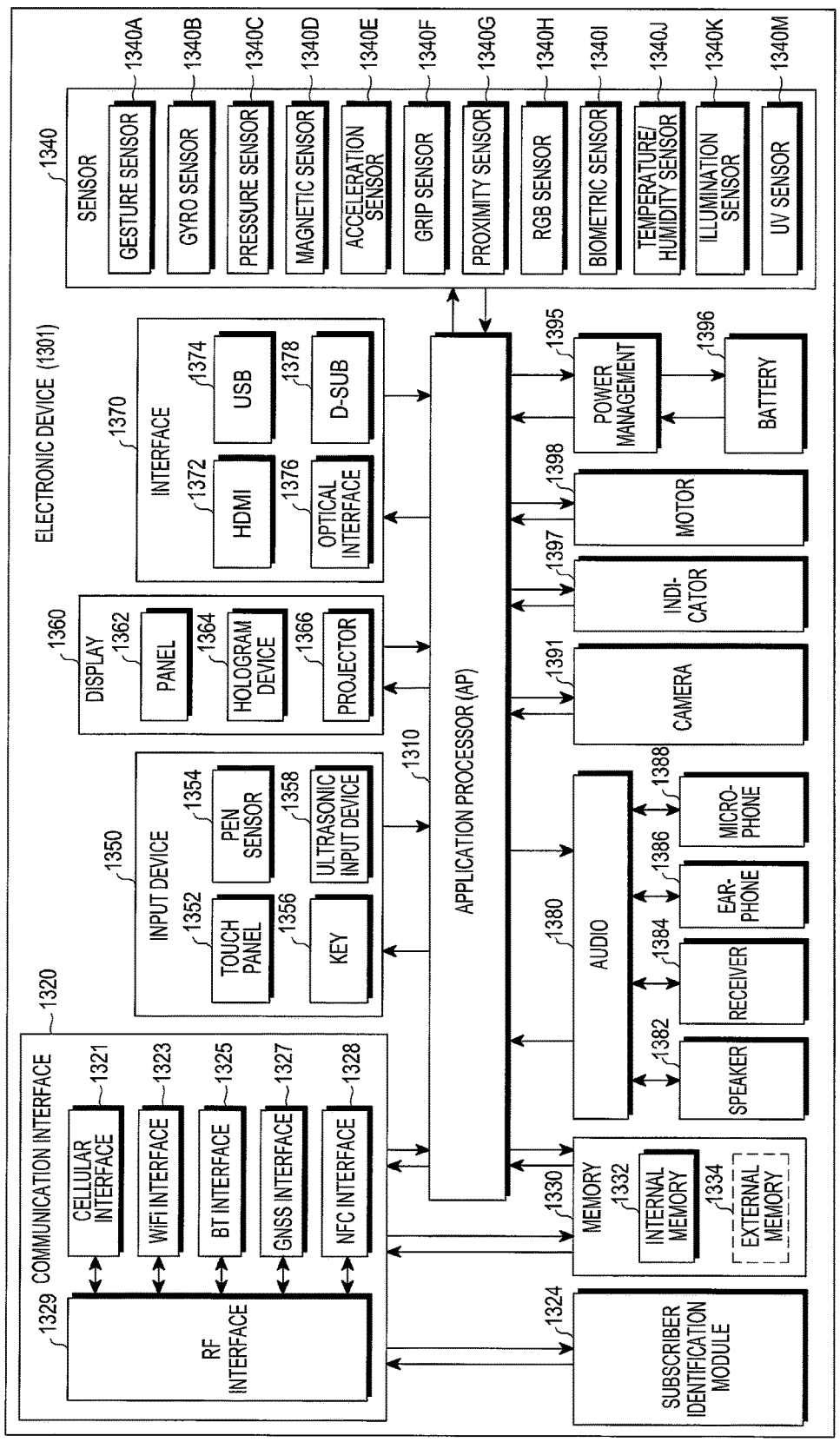
FIG. 13 illustrates a block diagram of an electronic device according to various embodiments of the present disclosure.

FIG. 13 illustrates a block diagram of an electronic device 1301 according to various embodiments. The electronic device 1301 may include, for example, the whole or part of the electronic device 101 illustrated in FIG. 1. The electronic device 1301 may include one or more processors 1310 (for example, an application processor (AP)), a communication interface 1320, a subscriber identification module 1324, a memory 1330, a sensor 1340, an input device 1350, a display 1360, an interface 1370, an audio 1380, a camera 1391, a power management 1395, a battery 1396, an indicator 1397, and a motor 1398.

The processor 1310 may control a plurality of hardware or software components connected to the processor 1310 by driving an operating system or an application program and perform processing of various pieces of data and calculations. The processor 1310 may be implemented by, for example, a system on chip (SoC). According to an embodiment, the processor 1310 may further include a graphic processing unit (GPU) and/or an image signal processor. The processor 1310 may include at least some (for example, a cellular interface 1321) of the elements illustrated in FIG. 13. The processor 1310 may load, into a volatile memory, instructions or data received from at least one (for example, a non-volatile memory) of the other elements and may process the loaded instructions or data, and may store various data in a non-volatile memory.

The communication interface 1320 may have a configuration equal or similar to that of the communication interface of FIG. 1. The communication interface 1320 may include, for example, a cellular interface 1321, a Wi-Fi interface 1323, a Bluetooth interface 1325, a GNSS interface 1327 (for example, a GPS interface, a Glonass interface, a Beidou interface, or a Galileo interface), an NFC interface 1328, and a radio frequency (RF) interface 1329.

The cellular interface 1321 may provide a voice call, an image call, a text message service, or an Internet service through, for example, a communication network. According to an embodiment, the cellular interface 1321 may distinguish between and authenticate electronic devices 1301 within a communication network using a subscriber identification module (for example, the SIM card 1324). According to an embodiment, the cellular interface 1321 may perform at least some of the functions that the processor 1310 may provide. According to an embodiment, the cellular interface 1321 may include a communication processor (CP).

The Wi-Fi interface 1323, the Bluetooth interface 1325, the GNSS interface 1327, or the NFC interface 1328 may include, for example, a processor that processes data transmitted and received through the corresponding interface. According to some embodiments, at least some (two or more) of the cellular interface 1321, the Wi-Fi interface 1323, the BT interface 1325, the GNSS interface 1327, and the NFC interface 1328 may be included in one integrated chip (IC) or IC package.

The RF interface 1329 may transmit/receive, for example, a communication signal (for example, an RF signal). The RF interface 1329 may include, for example, a transceiver, a power amp module (PAM), a frequency filter, a low noise amplifier (LNA), or an antenna. According to another embodiment, at least one of the cellular interface 1321, the Wi-Fi interface 1323, the BT interface 1325, the GNSS interface 1327, and the NFC interface 1328 may transmit/receive an RF signal through a separate RF interface.

The subscriber identification module 1324 may include, for example, a card including a subscriber identity module and/or an embedded SIM, and may contain unique identification information (for example, an integrated circuit card identifier (ICCID)) or subscriber information (for example, an international mobile subscriber identity (IMSI)).

The memory 1330 (for example, the memory 130) may include, for example, an internal memory 1332 or an external memory 1334. The internal memory 1332 may include at least one of, for example, a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard driver, or a solid state drive (SSD).

The external memory 1334 may further include a flash drive, for example, a compact flash (CF), a secure digital (SD), a micro secure digital (Micro-SD), a mini secure digital (Mini-SD), an extreme digital (xD), a memory stick, or the like. The external memory 1334 may be functionally and/or physically connected to the electronic device 1301 through various interfaces.

The sensor 1340 may measure a physical quantity or detect an operational state of the electronic device 1301, and may convert the measured or detected information into an electrical signal. The sensor 1340 may include, for example, at least one of a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (for example, a red, green, blue (RGB) sensor), a biometric sensor 1340I, a temperature/humidity sensor 1340J, a light sensor 1340K, and a ultraviolet (UV) sensor 1340M. Additionally or alternatively, the sensor 1340 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor 1340 may further include a control circuit for controlling one or more sensors included therein. In some embodiments, an electronic device 1301 may further include a processor configured to control the sensor 1340 as a part of or separately from the processor 1310, and may control the sensor 1340 while the processor 1310 is in a sleep state.

The input device 1350 may include, for example, a touch panel 1352, a (digital) pen sensor 1354, a key 1356, and an ultrasonic input unit 1358. The touch panel 1352 may use at least one of, for example, a capacitive scheme, a resistive scheme, an infrared scheme, and an ultrasonic scheme. Further, the touch panel 1352 may further include a control circuit. The touch panel 1352 may further include a tactile layer and provide a tactile reaction to the user.

The (digital) pen sensor 1354 may include, for example, a recognition sheet which is a part of the touch panel or is separated from the touch panel. The key 1356 may include, for example, a physical button, an optical key or a keypad. The ultrasonic input device 1358 may detect an ultrasonic wave generated by an input tool through a microphone and identify data corresponding to the detected ultrasonic wave.

The display 1360 may include a panel 1362, a hologram device 1364 or a projector 1366. The panel 1362 may be implemented to be, for example, flexible, transparent, or wearable. The panel 1362 and the touch panel 1352 may be implemented as one interface. The hologram device 1364 may show a three dimensional image in the air by using an interference of light. The projector 1366 may display an image by projecting light onto a screen. The screen may be located, for example, in the interior of or on the exterior of the electronic device 1301. According to an exemplary embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a d-subminiature (D-sub) 1378. Additionally or alternatively, the interface 1370 may include, for example, a mobile high-definition link (MHL) interface, a secure digital (SD) card/multi-media card (MMC) interface, or an infrared data association (IrDA) standard interface.

The audio 1380 may bilaterally convert, for example, a sound and an electrical signal. At least some elements of the audio 1380 may be included in, for example, the input/output interface. The audio 1380 may process sound information which is input or output through, for example, a speaker 1382, a receiver 1384, earphones 1386, the microphone 1388 or the like.

The camera 1391 is, for example, a device which may photograph a still image and a dynamic image. According to an embodiment, the camera 1391 may include one or more image sensors (for example, a front sensor or a back sensor), a lens, an Image Signal Processor (ISP) or a flash (for example, LED or xenon lamp).

The power management 1395 may manage, for example, power of the electronic device 1301. According to an embodiment, the power management 1395 may include a power management integrated circuit (PMIC), a charger integrated circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 1396, and a voltage, a current, or a temperature during the charging. The battery 1396 may include, for example, a rechargeable battery or a solar battery.

The indicator 1397 may indicate a particular state (for example, a booting state, a message state, a charging state, or the like) of the electronic device 1301 or a part (for example, the processor 1310) of the electronic device 1301. The motor 1398 may convert an electrical signal into mechanical vibration, and may generate vibration, a haptic effect, or the like. Although not illustrated, the electronic device 1301 may include a processing unit (for example, a GPU) for supporting a mobile television (TV). The processing unit for supporting mobile TV may, for example, process media data according to a certain standard such as digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium having instructions stored therein is provided. The instructions are configured to instruct at least one processor to perform at least one operation when the instructions are executed by at least one processor. At least one operation may include an operation of identifying a first power mode corresponding to output power selected for the RF signal transmission among a plurality of power modes of a power amplifier (PA) based on characteristics of the PA, an operation of determining input power corresponding to the output power by using information on at least two first data points stored in accordance with the first power mode, and an operation of supplying the determined input power to the PA.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a housing;
    an antenna included within at least one of the housing or formed by a part of the housing;
    a power amplifier (PA) electrically connected to the antenna;
    a radio frequency (RF) transmission circuit electrically connected to the PA;
    a processor electrically connected to the RF transmission circuit and the PA; and
    a memory electrically connected to the processor,
    wherein the memory stores information on a change in output power according to a change in input power of the PA, the information containing a first data point obtained by supplying first input power to the PA and measuring first output from the PA, a second data point obtained by supplying second input power to the PA and measuring second output from the PA, a first plurality of data points generated by being linearly interpolated between the first data point and the second data point, change information on a change in output power according to a change in input power of the PA for a first operation voltage of a first power mode of the PA, and an additional data point associated with a second operation voltage of the first power mode; and
    the memory stores instructions, when the instructions are executed, to instruct the processor to:
    select output power of the PA required when a signal is transmitted through the antenna;
    identify input power of the PA corresponding to the output power of the PA by using at least one of the first data point, the second data point, or the first plurality of data points when the PA receives the first operation voltage;
    identify the input power of the PA corresponding to the output power of the PA by using change information and the additional data point, when the PA receives the second operation voltage; and
    control the identified input power to be inputted into the PA so that PA outputs the selected output power to the RF transmission circuit.

2. The electronic device of claim 1, wherein the information contains a third data point based on third input power, a fourth data point based on fourth input power, and a second plurality of data points linearly formed between the third data point and the fourth data point, and at least some of output values of the second plurality of data points are smaller than output values of the first plurality of data points.

3. The electronic device of claim 2, wherein at least one of the first data point, the second data point, or the first plurality of data points is associated with the first power mode of the PA, and wherein at least one of the third data point, the fourth data point, or the second plurality of data points is associated with a second power mode of the PA.

4. The electronic device of claim 2, wherein the information contains a fifth data point based on fifth input power, a sixth data point based on sixth input power, and a third plurality of data points linearly formed between the fifth data point and the sixth data point, and wherein some of output values of the third plurality of data points are smaller than output values of the second plurality of data points.

5. The electronic device of claim 4, wherein at least one of the fifth data point, the sixth data point, or the third plurality of data points is associated with a third power mode of the PA.

6. The electronic device of claim 1, wherein the memory stores information on a change in output power according to a change in input power of the PA according to each of a plurality of power modes of the PA set based on characteristics of the PA.

7. A method of operating an electronic device to transmit an RF signal, the method comprising:
    selecting output power of a PA included in the electronic device, that is required when a signal is transmitted through an antenna included in the electronic device;
    identifying input power of the PA corresponding to the output power of the PA by using at least one of a first data point, a second data point, or a plurality of data points stored in a memory included in the electronic device when the PA receives a first operation voltage;
    identifying the input power of the PA corresponding to the output power of the PA by using change information and an additional data point, when the PA receives a second operation voltage; and controlling the identified input power to be inputted into the PA so that the PA outputs the selected output power to an RF transmission circuit included in the electronic device, wherein the first data point is obtained by supplying first input power to the PA and measuring first output from the PA, the second data point is obtained by supplying second input power to the PA and measuring second output from the PA, wherein the change information on a change in output power according to a change in input power of the PA for the first operation voltage of a first power mode of the PA, and the additional data point associated with the second operation voltage of the first power mode, and wherein the plurality of data points are generated by being linearly interpolated between the first data point and the second data point.

* * * * *